(12) United States Patent
Kang et al.

(10) Patent No.: US 12,501,017 B2
(45) Date of Patent: *Dec. 16, 2025

(54) IMAGE SIGNAL PROCESSOR, IMAGE PROCESSING SYSTEM AND METHOD OF BINNING PIXELS IN IMAGE SENSOR

(71) Applicant: Samsung Electronics Co., Ltd., Suwon-si (KR)

(72) Inventors: Hee Kang, Hwaseong-si (KR); Young-Jun Song, Seoul (KR); Dong-Ki Min, Seoul (KR); Jong-Min You, Seongnam-si (KR); Jee-Hong Lee, Seoul (KR); Seok-Jae Kang, Seoul (KR); Taek-Sun Kim, Hwaseong-si (KR); Joon-Hyuk Im, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

This patent is subject to a terminal disclaimer.

(21) Appl. No.: 18/588,579

(22) Filed: Feb. 27, 2024

(65) Prior Publication Data
US 2024/0283904 A1    Aug. 22, 2024

Related U.S. Application Data

(63) Continuation of application No. 17/954,471, filed on Sep. 28, 2022, now Pat. No. 11,956,411, which is a (Continued)

(30) Foreign Application Priority Data

Jul. 13, 2017  (KR) ........................ 10-2017-0089143
Oct. 30, 2017  (KR) ........................ 10-2017-0142870

(51) Int. Cl.
H04N 13/271   (2018.01)
H04N 13/239   (2018.01)
(Continued)

(52) U.S. Cl.
CPC ......... *H04N 13/271* (2018.05); *H04N 13/239* (2018.05); *H04N 23/10* (2023.01);
(Continued)

(58) Field of Classification Search
CPC .. H04N 13/271; H04N 13/239; H04N 25/704; H04N 25/778; H04N 25/46;
(Continued)

(56) References Cited

U.S. PATENT DOCUMENTS 9,380,296 B2    6/2016  Hyun
9,888,257 B2    2/2018  Ge et al.
(Continued)

FOREIGN PATENT DOCUMENTS

CN    104952074 B    9/2017

OTHER PUBLICATIONS

Office Action, dated Dec. 13, 2021, from the Chinese Patent Office for corresponding Chinese Patent Application No. 201810775028.0 (9 pages).

*Primary Examiner* — Jonathan R Messmore
(74) *Attorney, Agent, or Firm* — Muir Patent Law, PLLC

(57) ABSTRACT

An image signal processor includes a register and a disparity correction unit. The register stores disparity data obtained from a pattern image data that an image senor generates, and the image sensor includes a plurality of pixels, and each of the pixel includes at least a first photoelectric conversion element and a second photoelectric conversion element. The image sensor generates the pattern image data in response to a pattern image located at a first distance from the image sensor. The disparity correction unit corrects a disparity distortion of an image data based on the disparity data to generate a result image data, and the image senor generates the image data by capturing an object.

20 Claims, 24 Drawing Sheets

Related U.S. Application Data continuation of application No. 15/984,692, filed on May 21, 2018, now Pat. No. 11,463,677.

(51) Int. Cl.
| | |
|---|---|
| *H04N 23/10* | (2023.01) |
| *H04N 23/62* | (2023.01) |
| *H04N 23/80* | (2023.01) |
| *H04N 25/10* | (2023.01) |
| *H04N 25/46* | (2023.01) |
| *H04N 25/61* | (2023.01) |
| *H04N 25/704* | (2023.01) |
| *H04N 25/778* | (2023.01) |
| *H04N 13/00* | (2018.01) |

(52) U.S. Cl.
CPC ............. *H04N 23/62* (2023.01); *H04N 23/80* (2023.01); *H04N 25/10* (2023.01); *H04N 25/46* (2023.01); *H04N 25/61* (2023.01); *H04N 25/704* (2023.01); *H04N 25/778* (2023.01); *H04N 2013/0081* (2013.01)

(58) Field of Classification Search
CPC ........ H04N 23/80; H04N 23/10; H04N 25/10; H04N 25/61; H04N 23/62
See application file for complete search history.

(56) References Cited

U.S. PATENT DOCUMENTS

| | | | |
|---|---|---|---|
| 10,015,471 B2* | 7/2018 | Agranov | H04N 25/134 |
| 2007/0145445 A1 | 6/2007 | Jeong | |
| 2009/0310225 A1 | 12/2009 | Matsusaka et al. | |
| 2012/0007954 A1 | 1/2012 | Miller et al. | |
| 2012/0133747 A1 | 5/2012 | Takahashi et al. | |
| 2014/0002601 A1* | 1/2014 | Takano | H04N 13/398 |
| | | | 348/43 |
| 2014/0341290 A1 | 11/2014 | Merkle et al. | |
| 2015/0028102 A1 | 1/2015 | Ren et al. | |
| 2015/0049172 A1 | 2/2015 | Ramachandra et al. | |
| 2017/0118399 A1 | 4/2017 | Kim et al. | |
| 2017/0127082 A1 | 5/2017 | Chen et al. | |
| 2017/0359497 A1 | 12/2017 | Mandelli et al. | |
| 2018/0288306 A1 | 10/2018 | Lay et al. | |
| 2018/0367747 A1 | 12/2018 | Mo et al. | |
| 2019/0297283 A1 | 9/2019 | Douady et al. | |

\* cited by examiner

FIG. 2

FIG. 6B
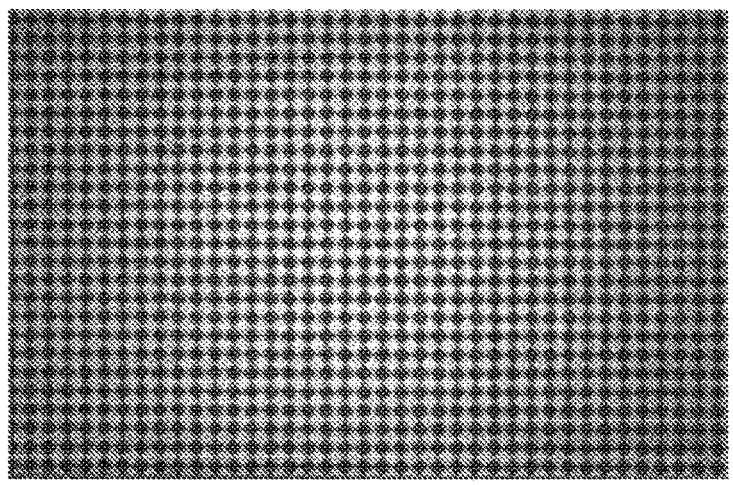
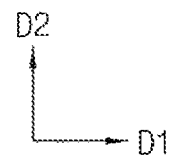
FIG. 6C
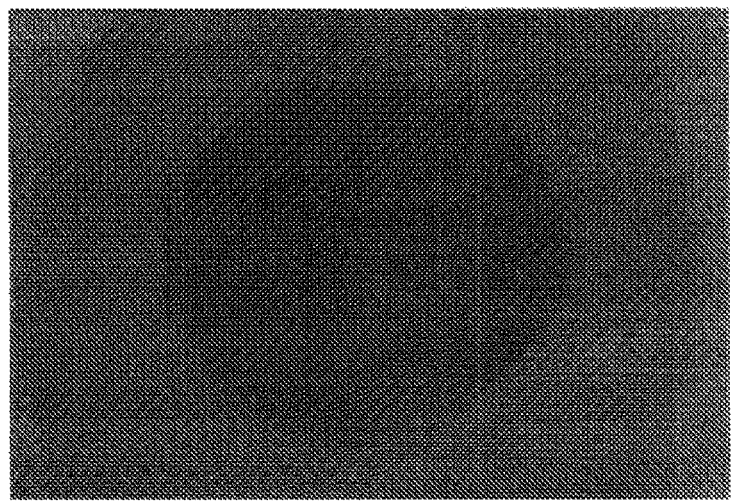
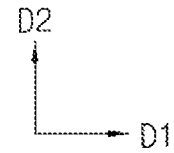

FIG. 9A
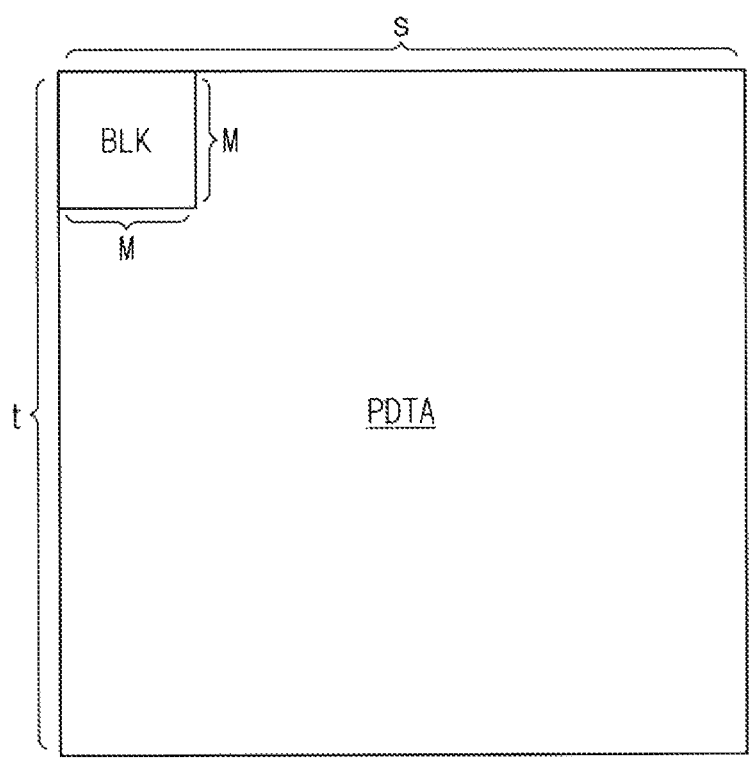
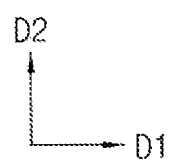

FIG. 9B
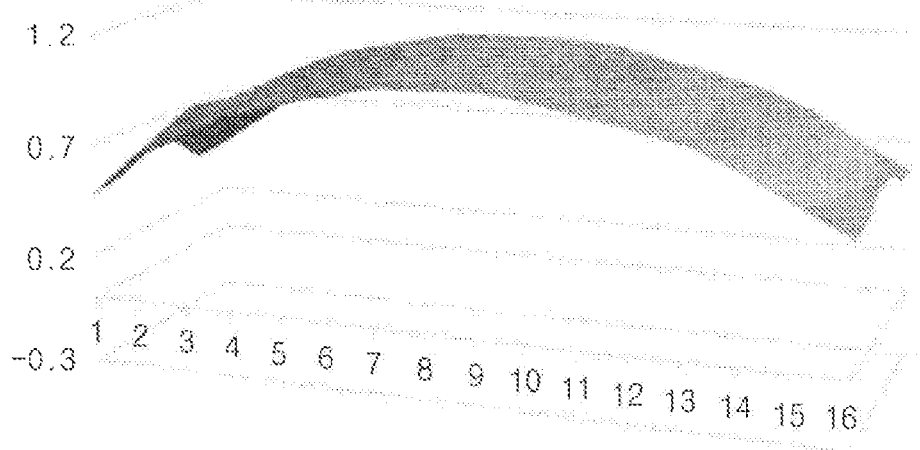
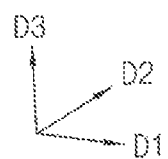

| -3 | -3 | -3 | -3 | -3 | -3 | -3 | -3 | -3 | -3 |
|----|----|----|----|----|----|----|----|----|----|
| -3 | -3 | -3 | -3 | -1 | -1 | -3 | -3 | -3 | -3 |
| -3 | -3 | -2 | -1 | -1 | -1 | -1 | -2 | -3 | -3 |
| -3 | -2 | -1 | -1 | 0 | 0 | -1 | -1 | -2 | -3 |
| -3 | -1 | -1 | 0 | 0 | 0 | 0 | -1 | -1 | -3 |
| -3 | -1 | -1 | 0 | 0 | 0 | 0 | -1 | -1 | -3 |
| -3 | -2 | -1 | -1 | 0 | 0 | -1 | -1 | -2 | -3 |
| -3 | -3 | -2 | -1 | -1 | -1 | -1 | -2 | -3 | -3 |
| -3 | -3 | -3 | -2 | -1 | -1 | -2 | -3 | -3 | -3 |
| -3 | -3 | -3 | -3 | -3 | -3 | -3 | -3 | -3 | -3 |

FIG. 16

| W | R | W | R | W |
|---|---|---|---|---|
| B | W | B | W | B |
| W | R | W | R | W |
| B | W | B | W | B |

FIG. 17

| G | R | G | R | G |
|---|---|---|---|---|
| B | W | B | W | B |
| G | R | G | R | G |
| B | W | B | W | B |

IMAGE SIGNAL PROCESSOR, IMAGE PROCESSING SYSTEM AND METHOD OF BINNING PIXELS IN IMAGE SENSOR

CROSS-REFERENCE TO RELATED APPLICATION

This U.S. nonprovisional application is a continuation of U.S. patent application Ser. No. 17/954,471, filed Sep. 28, 2022, in the U.S. Patent and Trademark Office, which is a continuation of U.S. patent application Ser. No. 15/984,692, filed May 21, 2018, now U.S. Pat. No. 11,463,677, which claims the benefit of priority under 35 U.S.C. § 119 to Korean Patent Application No. 10-2017-0089143, filed on Jul. 13, 2017, and to Korean Patent Application No. 10-2017-0142870, filed on Oct. 30, 2017, in the Korean Intellectual Property Office (KIPO), the entire contents of all of which are herein incorporated by reference.

BACKGROUND

1. Technical Field

Exemplary embodiments relate to image sensors, and more particularly to image signal processors, image processing systems and methods of binning pixels in image sensors.

2. Description of the Related Art

An image sensor is a semiconductor device that converts a photo image, for example, light reflected by a subject, into an electric signal. Thus, image sensors are widely used in portable electronic devices, such as digital cameras, cellular phones, and the like. Generally, image sensors can be classified into charged coupled device (CCD) image sensors and complementary metal oxide semiconductor (CMOS) image sensors. CMOS image sensors have some advantages over CCD image sensors such as low manufacturing costs, low power consumption, ease of integration with peripheral circuits, and the like. Recently, image sensors employing multi-photodiodes are used.

SUMMARY

According to some exemplary embodiments, an image signal processor includes a register and a disparity correction unit. The register is configured to store disparity data obtained from pattern image data that is generated by an image senor, wherein the image sensor includes a plurality of pixels, and each of the pixels including at least a first photoelectric conversion element and a second photoelectric conversion element. The image sensor is configured to generate the pattern image data in response to a pattern image located at a first distance from the image sensor. The disparity correction unit implemented in hardware and configured to correct a disparity distortion of an image data based on the disparity data in order to generate result image data, wherein the image sensor generates the image data by capturing an object.

According to some exemplary embodiments, an image processing system includes an image sensor, a disparity processing module and an image signal processor. The image sensor includes a plurality of pixels, each of the pixels includes at least a first photoelectric conversion element and a second photoelectric conversion element, wherein the image sensor is configured to capture a pattern image located at a first distance from the image sensor and generate pattern image data based on the pattern image. The disparity processing module is configured to receive the pattern image data from the image sensor and provide disparity data based on the pattern image data. The image signal processor is configured to correct a disparity distortion of image data based on the disparity data to generate a result image data, wherein the image sensor is further configured to capture an object and generate the image data based on the object According to some exemplary embodiments, in a method of binning pixels in an image sensor including a pixel array having a plurality of pixels arranged in a regular pattern, each of the pixels including at least a first photoelectric conversion element and a second photoelectric conversion element, the method comprising: sequentially selecting a plurality of binning windows in the pixel array, each of the binning windows including $(2n)*(2m)$ pixels, where $2n$ represents a number of pixels in a first direction and $2m$ represents a number of pixels in a second direction, such that m pixels in the second direction are repeatedly selected, and a binning analog signal is generated based on analog signals generated from at least a portion of the pixels in each of the binning windows.

Accordingly, a disparity correction module in an image signal processor may correct a disparity distortion of image data output from an image sensor including a plurality of pixels, each including two photoelectric conversion elements, and the image sensor may enhance a resolution of the image data by binning analog signals outputs from the pixels, which employs a moving average.

BRIEF DESCRIPTION OF THE DRAWINGS

Illustrative, non-limiting example embodiments will be more clearly understood from the following detailed description taken in conjunction with the accompanying drawings.

FIG. 2 is a block diagram illustrating the pixel array in the image processing system of FIG. 1, according to exemplary embodiments.

FIG. 6B illustrates the pattern image of FIG. 6A.

FIG. 6C illustrates a disparity of a pattern image data.

FIG. 9A illustrates that the pattern image data is divided into a plurality of blocks in the disparity processing module in FIG. 1.

FIG. 9B illustrates a disparity data output from the disparity processing module in FIG. 1.

FIG. 11B illustrates the disparity map.

FIGS. 16 and 17 respectively illustrate examples of the pixel array in the image sensor in FIG. 1.

DETAILED DESCRIPTION OF THE EMBODIMENTS

Various example embodiments will be described more fully with reference to the accompanying drawings, in which embodiments are shown.

Figure 1:
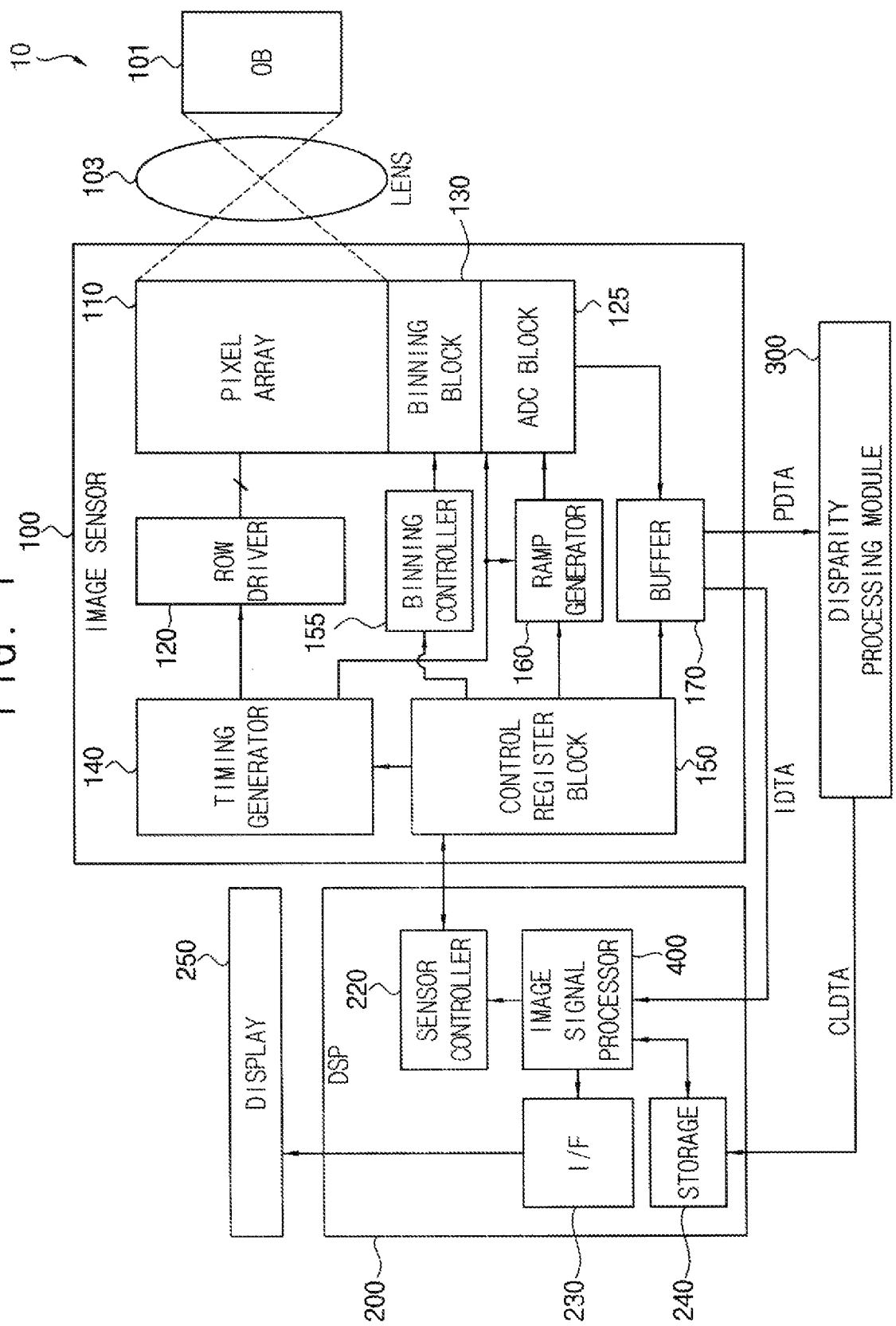
FIG. 1 is a block diagram illustrating an image processing system, according to exemplary embodiments.

FIG. 1 is a block diagram illustrating an image processing system according to exemplary embodiments.

Referring to FIG. 1, an image processing system 10 may be implemented as a portable electronic device such as, including but not limited to, a laptop computer, a cellular phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer, an internet of things (IoT) device, or an internet of everything (IoE) device.

The image processing system 10 may include an optical lens 103, a complementary metal-oxide-semiconductor (CMOS) image sensor (or, an image sensor) 100, a digital signal processor (DSP) 200, and a display 250. The image processing system 10 may further include a disparity processing module 300.

The image sensor 100 may generate image data IDTA corresponding to an object (OB) 101 input through the optical lens 103. The image data IDTA may correspond to pixel signals output from a plurality of photoelectric conversion elements. The image data IDTA may correspond to data including disparity information output from the plurality of photoelectric conversion elements. A photoelectric conversion element may be implemented as a photodiode, a phototransistor, a photogate, or a pinned-photodiode.

The image sensor 100 may include a pixel array 110, a row driver 120, an analog-to-digital converter (ADC) block 125, a binning block 130, a timing generator 140, a control register block 150, a binning controller 155, a ramp generator 160, and a buffer 170. The pixel array 110 may include a plurality of pixels arranged in two dimensions.

For example, the plurality of pixels may be arranged in rows and columns. The pixels of the image sensor 100 may be manufactured using CMOS manufacturing processes. Each of the pixels may include at least a first photoelectric conversion element and a second photoelectric conversion element.

Each of the pixels included in the pixel array 110 may include a photodiode. The photodiode is an example of a photoelectric conversion element and may be replaced with a phototransistor, a photogate, or a pinned-photodiode. The pixels may be arranged in a matrix in the pixel array 110. Each of the pixels may transmit a pixel signal to a column line.

The row driver 120 may drive control signals for controlling the operation of the pixels to the pixel array 110 according to the control of the timing generator 140. The row driver 120 may function as a control signal generator which generates the control signals.

The timing generator 140 may control the operations of the row driver 120, the ADC block 125, and the ramp generator 160 according to the control of the control register block 150.

The binning block 130 may bin a pixel signal output from each of the pixels included in the pixel array 110 and may output a binned pixel signal.

The ADC block 125 may include an ADC and memory for each column of pixels. The ADC may perform correlated double sampling (CDS). The ADC block 125 may include a plurality of ADCs. Each of the ADCs may be shared by photoelectric conversion elements in each pixel. The ADC block 125 may generate a digital image signal corresponding to the binned pixel signal output from the binning block 130.

The control register block 150 may control the operations of the timing generator 140, the binning controller 155, the ramp generator 160, and the buffer 170 according to the control of the DSP 200. The binning controller 155 may control the binning block 130 according to the control of the control register block 150.

The buffer 170 may transmit the image data IDTA corresponding to digital image signals output from the ADC block 125 to the DSP 200.

The DSP 200 may include an image signal processor (ISP) 400, a sensor controller 220, an interface (I/F) 230, and a storage 240.

The ISP 400 may control the interface 230 and the sensor controller 220 which controls the control register block 150. The CMOS image sensor 100 and the DSP 200 may be implemented in a single package, e.g., a multi-chip package (MCP).

Although the image sensor 100 and the ISP 400 are separated from each other in FIG. 1, the ISP 400 may be implemented as a part of the image sensor 100 in exemplary embodiments.

The ISP 400 may process the image data IDTA received from the buffer 170 and may transmit processed image data to the interface 230. In detail, the ISP 400 may interpolate the image data IDTA corresponding to pixel signals output from the pixels to generate interpolated image data. For example, the ISP 400 may correct disparity distortion of the image data IDTA to generate a result image data based on a disparity data (or, disparity correction data) CLDTA stored in the storage 240.

The sensor controller 220 may generate various control signals for controlling the control register block 150 according to the control of the ISP 400. The interface 230 may transmit the processed image data, i.e., the interpolated image data from the ISP 400 to the display 250.

The display 250 may display the interpolated image data output from the interface 230. The display 250 may be, including but not limited to, a thin film transistor-liquid crystal display (TFT-LCD), a light emitting diode (LED) display, an organic LED (OLED) display, an active-matrix OLED (AMOLED) display, or a flexible display.

The disparity processing module 300 may calculate disparity data of a pattern image data PDTA, which is generated by the image sensor 100 in response to a pattern image located at a first distance from the image sensor 100 and is output from the image sensor 100, and may store the calculated disparity data in the storage 240 as the disparity data CLDTA. The storage 240 may be implemented as a nonvolatile memory such as, including but not limited to, an EEPROM, a NAND flash, or a resistive type memory.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Although the image sensor 100 and the disparity processing module 300 are separated from each other in FIG. 1, the disparity processing module 300 may be implemented as a part of the image sensor 100 in exemplary embodiments.

Figure 2:
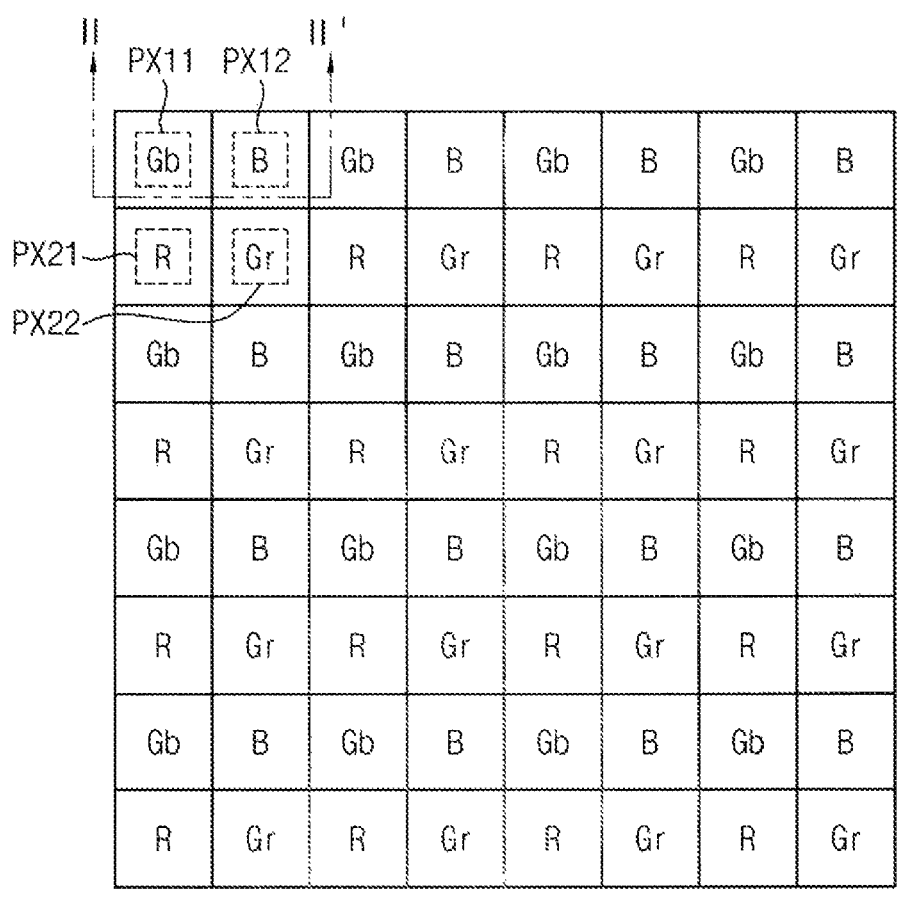

FIG. 2 is a block diagram illustrating the pixel array in the image processing system of FIG. 1, according to exemplary embodiments.

The pixel array illustrated in FIG. 2 may include a color filter array of the pixel array.

A pixel array may have an 8*8 (* denotes a multiplication) matrix structure. Furthermore, it is assumed that one pixel PX includes four sub-pixels SP (not illustrated) adjacently arranged. However, the embodiments are not limited thereto, but the arrangement of the pixel array 110 and a color filter array may be variously changed or modified without departing from the scope and spirit of the disclosure.

Referring to FIG. 2, the pixel array 110 may include a plurality of pixels PX11~PX22. As illustrated in FIG. 2, each of the plurality of pixels PX11 to PX22 may include a plurality of sub-pixels SP11_1~SP22_4 (not illustrated). For example, pixel PX11 may include sub-pixels SP11_1, SP11_2, SP11_3, and SP11_4, pixel PX12 may include sub-pixels SP12_1, SP12_2, SP12_3, and SP12_4, pixel PX21 may include sub-pixels SP21_1, SP21_2, SP21_3, and SP21_4, and pixel PX22 may include sub-pixels SP22_1, SP22_2, SP22_3, and SP22_4.

The pixel PX11 may include a first color filter (for example, a first green (Gb) color filter). For example, the pixel PX11 may convert green light into an electrical signal. The pixel PX12 may include a second color filter (for example, a blue (B) color filter). For example, the PX12 may convert blue light into an electrical signal.

The pixel PX21 may include a third color filter (for example, a red (R) color filter). For example, the pixel PX21 may convert red light into an electrical signal. The pixel PX22 may include a fourth color filter (for example, a second green (Gr) color filter). For example, pixel PX22 may convert green light into an electrical signal.

One pixel PX may include four pixels which are adjacently arranged, and four pixels included in one pixel may include the same color filter. For example, when pixel PX11 includes a first color filter (e.g., a first green (Gb) color filter), then each of sub-pixels SP11_1, SP11_2, SP11_3, and SP11_4 may also include the same first color filter.

In exemplary embodiments, the four pixels PX11, PX12, PX21, and PX22 may constitute a Bayer pattern. The Bayer pattern is described with reference to FIG. 2. However, embodiments are not limited thereto. For example, the pixel array 110 may include various color filter array patterns such as an RGBE pattern, a CYGM pattern, a CYYM pattern, and the like.

Figure 3:
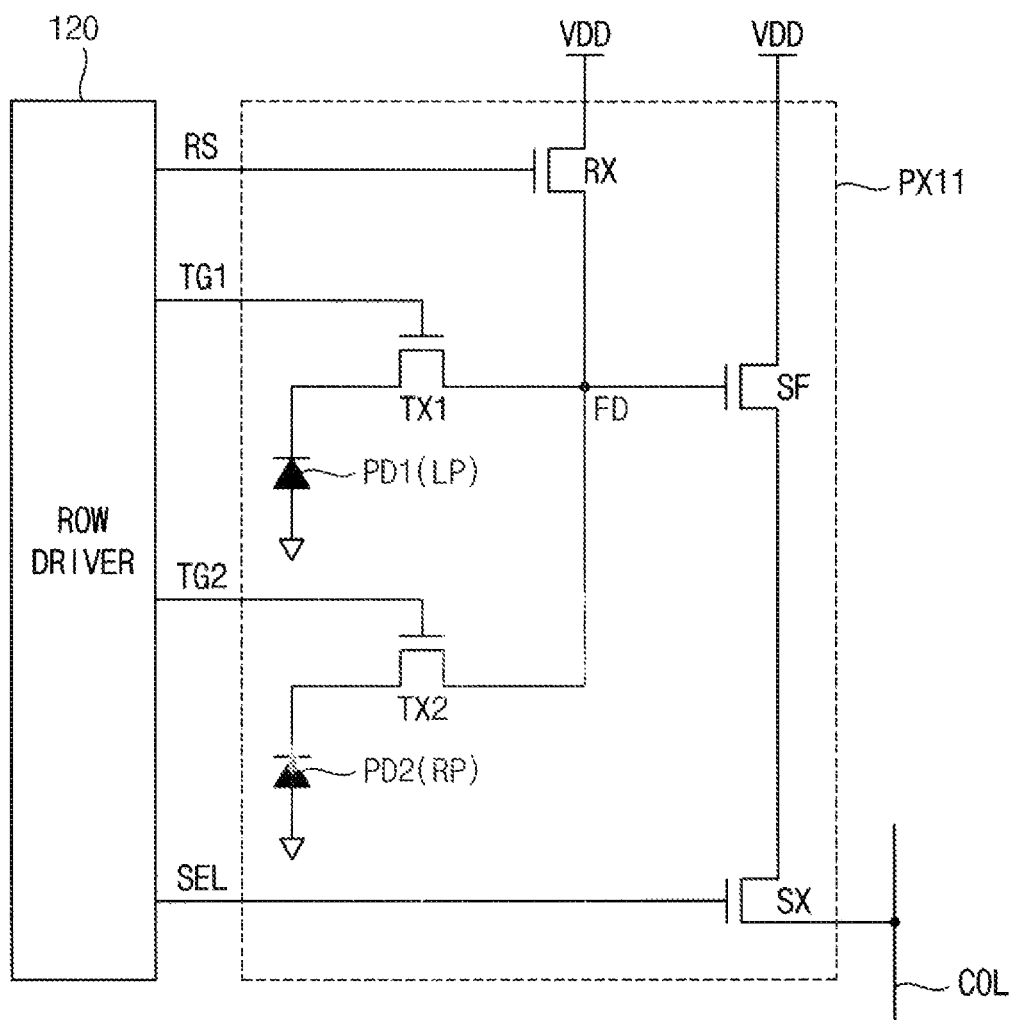
FIG. 3 is a diagram for describing one pixel illustrated in FIG. 2, according to exemplary embodiments.

FIG. 3 is a diagram for describing one pixel PX illustrated in FIG. 2 according to exemplary embodiments. In embodiments where the pixel PX includes four sub-pixels SP, the description of FIG. 3 may apply to the individual sub-pixels SP.

The example embodiment of FIG. 3 is a pixel having a 5-transistors structure. However, the disclosure is not limited thereto. A pixel may be changed or modified to have various pixel structures.

Referring to FIGS. 2 and 3, the pixel PX11 may include two photodiodes PD1 and PD2, two transfer transistors TX1 and TX2, a reset transistor RX, a source follower SF, and a selection transistor SX.

The first transfer transistor TX1 may have one end connected to a cathode of the first photodiode PD1, the other end thereof connected to a floating diffusion node FD, and a control electrode to receive a control signal TG1. The second transfer transistor TX2 may have one end connected to a cathode of the second photodiode PD2, the other end thereof connected to the floating diffusion node FD, and a control electrode to receive a control signal TG2.

One end of the reset transistor RX may be connected to receive a power supply voltage VDD, the other end thereof may be connected to the floating diffusion node FD, and a control electrode may be connected to receive a control signal RS. One end of the source follower SF may be connected to receive the power supply voltage VDD, the other end thereof may be connected to one end of the selection transistor SX, and a control electrode thereof may be connected to the floating diffusion node FD. One end of the selection transistor SX may be connected to receive the power supply voltage VDD, the other end thereof may be connected to the column line COL, and a control electrode thereof may be connected to receive a control signal SEL.

Each of control signals TG1, TG2, RS, and SEL, which can respectively control transistors TX1, TX2, RX, and SX, may be output from the row driver 120. An output signal of the selection transistor SX is supplied to the column line COL.

For convenience of description in FIG. 3, a pixel which has a shared floating diffusion node FD is shown. However, in other embodiments, photodiodes PD1 and PD2 may not share a single floating diffusion region (FD).

Figure 4:
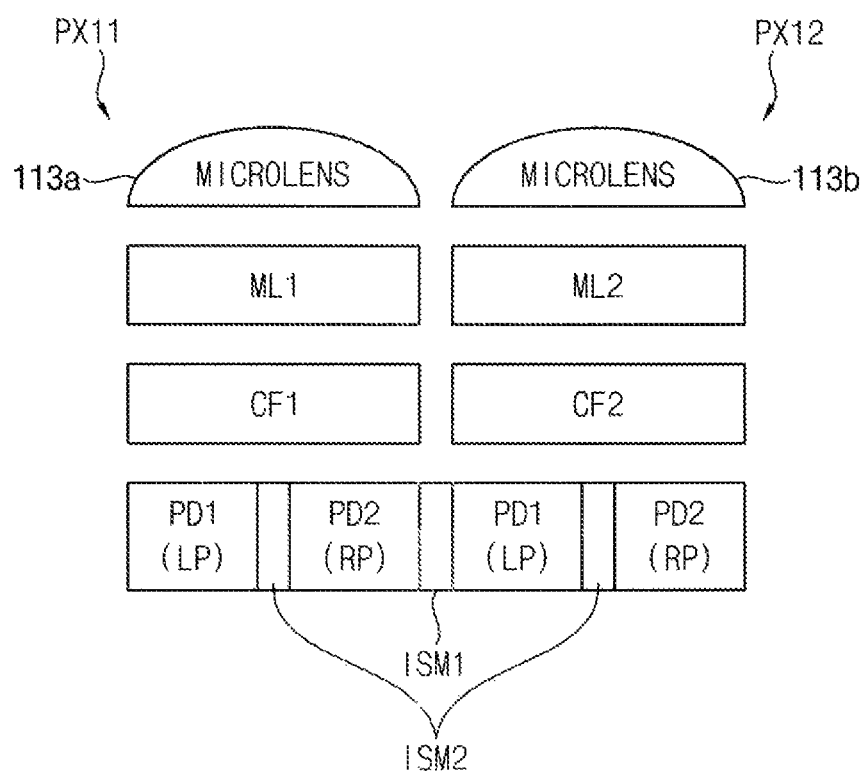
FIG. 4 is cross-sectional views of pixels including photodiodes taken along the line II-II' illustrated in the pixel array of FIG. 2, according to exemplary embodiments.

FIG. 4 is cross-sectional views of pixels including photodiodes taken along the line II-II' illustrated in the pixel array of FIG. 2, according to exemplary embodiments.

Referring to FIGS. 2 and 4, the first pixel PX11 may include first and second photodiodes PD1 and PD2, a first color filter CF1 placed on the first and second photodiodes PD1 and PD2, a first microlens ML1 placed on the first color filter CF1, and a microlens 113a placed on the first microlens ML1. The first color filter CF1 may be a green color filter. In an exemplary embodiment, the first microlens ML1 may not be included in the first pixel PX11.

The second pixel PX12 may include first and second photodiodes PD1 and PD2, a second color filter CF2 placed on the first and second photodiodes PD1 and PD2, a second microlens ML2 placed on the second color filter CF2, and a microlens 113b placed on the second microlens ML2. The second color filter CF2 may be a blue color filter. In an exemplary embodiment, the second microlens ML2 may not be included in the second pixel PX12.

A first isolation material ISM1 may be placed between the first pixel PX11 and the second pixel PX12. A second isolation material ISM2 may be placed between two photodiodes PD1 and PD2 in each of the pixels PX11 and PX12. The first and second isolation materials ISM1 and ISM2 may be formed using deep trench isolation (DTI).

FIGS. 5A through 5D are diagrams for explaining a difference between a first image data and a second image data output from the image sensor of FIG. 1.

Figure 5A:
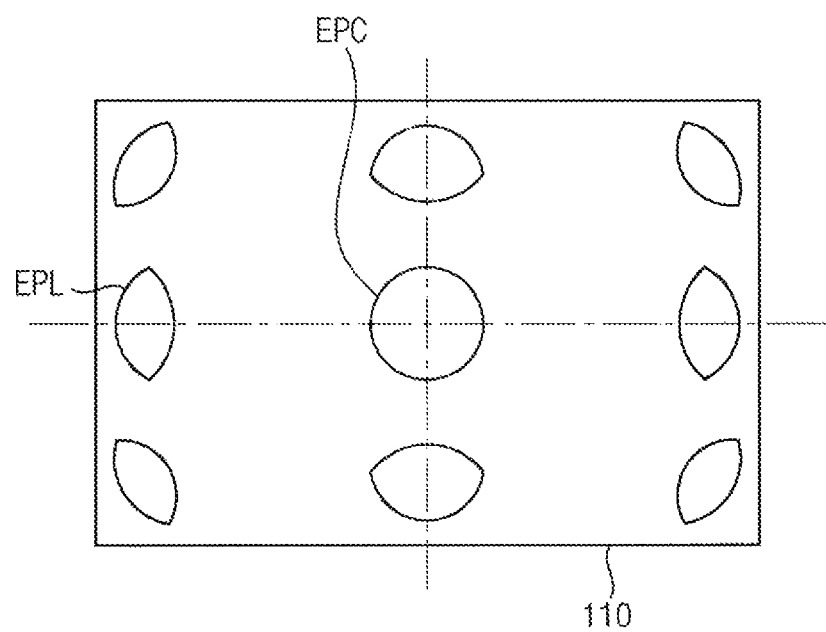
FIGS. 5A through 5D are diagrams for explaining a difference between a first image data and a second image data output from the image sensor of FIG. 1.

FIG. 5A illustrate shapes of an exit pupil for the image sensor 100. The exit pupil represents the aperture of light receiving part of the image sensor 100 when the image sensor 100 captures an image of an object viewed by a camera lens PL in FIG. 5B.

Figure 5B:
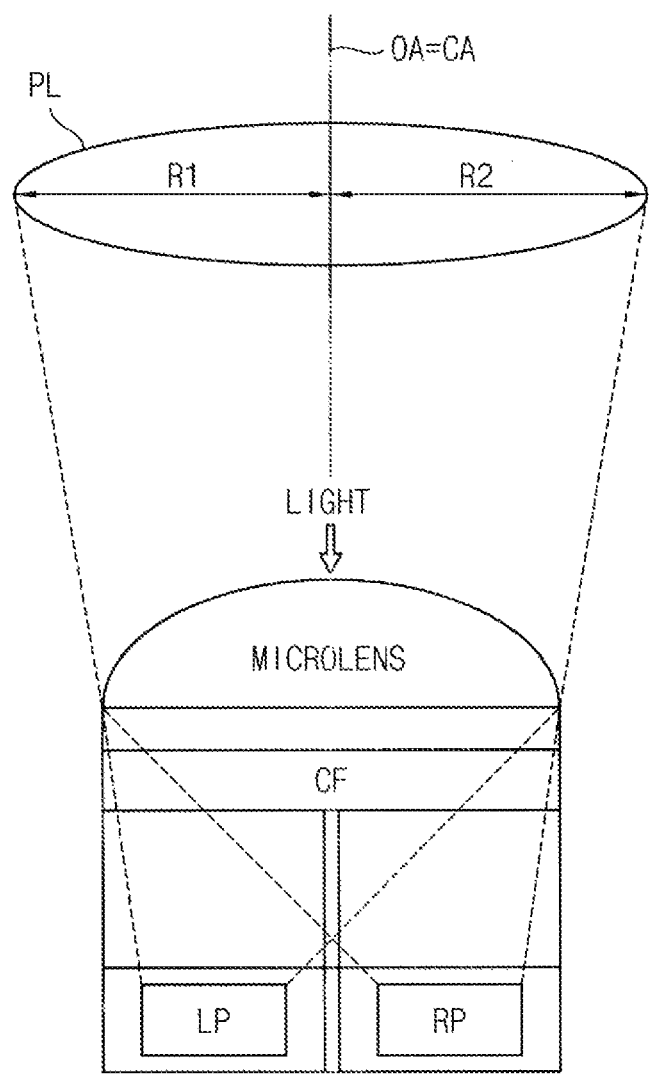

Referring to FIGS. 5A and 5B, when a central axis CA of a pixel coincides with an optical axis OA of a photographic lens PL, a distance R1 from the central axis CA of the pixel to one side of the photographic lens PL (the left end of the photographic lens PL in the figure) is equal to the distance R2 from the central axis CA of the pixel to the other side (right end) of the photographic lens PL. Accordingly, the amount of light incident on the first photoelectric conversion element LP is the same as the amount of light incident on the second photoelectric conversion element RP. As a result, a central exit pupil EPC is formed. The photographic lens PL may correspond to the optical lens 103 in FIG. 1.

Figure 5C:
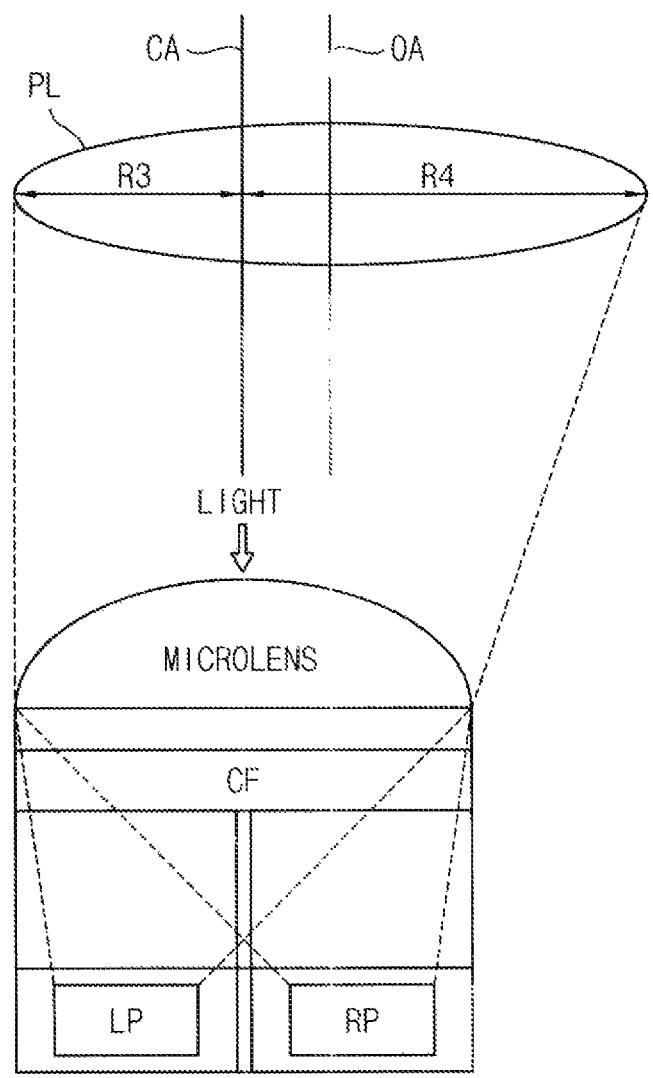

Referring to FIGS. 5A and 5C, when the central axis CA of the pixel is displaced to one side, i.e., to the left in this example, from the optical axis OA of the photographic lens PL, the distance R4 from the central axis CA of the pixel to the right end of the photographic lens PL is longer than the distance R3 from the photographic lens CA of the pixel to the left end of the photographic lens PL. Accordingly, the amount of light incident on the first photoelectric conversion element LP is greater than the amount of light incident on the second photoelectric conversion element RP. As a result, a left exit pupil EPL is formed.

Thus, as for each of the pixels of the pixel array 110, the amount of light incident on the first photoelectric conversion element LP used to generate the first image data (i.e., a left image data) and the amount of light incident on the second photoelectric conversion element RP used to generate the second image data (i.e., a right image data) depend on the relative position of the pixel. Accordingly, the shape of exit pupil depends on the relative position or location of the pixel in the image sensor 100.

Figure 5D:
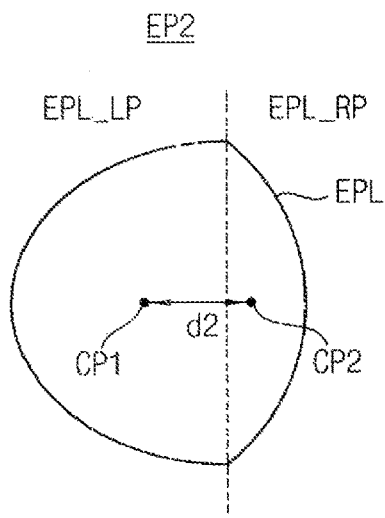

Referring to FIGS. 5A, 5C, and 5D, the left exit pupil EPL may be divided into a first portion EPL_LP associated with the first photoelectric conversion element LP and a second portion EPL_RP associated with the second photoelectric conversion element RP. Distortion of the disparity is generated because a distance d2 between a central position CP1 in the first portion EPL_LP and a central position CP2 in the second portion EPL_RP varies with respect to each of the pixels included in the pixel array 110.

Figure 6A:
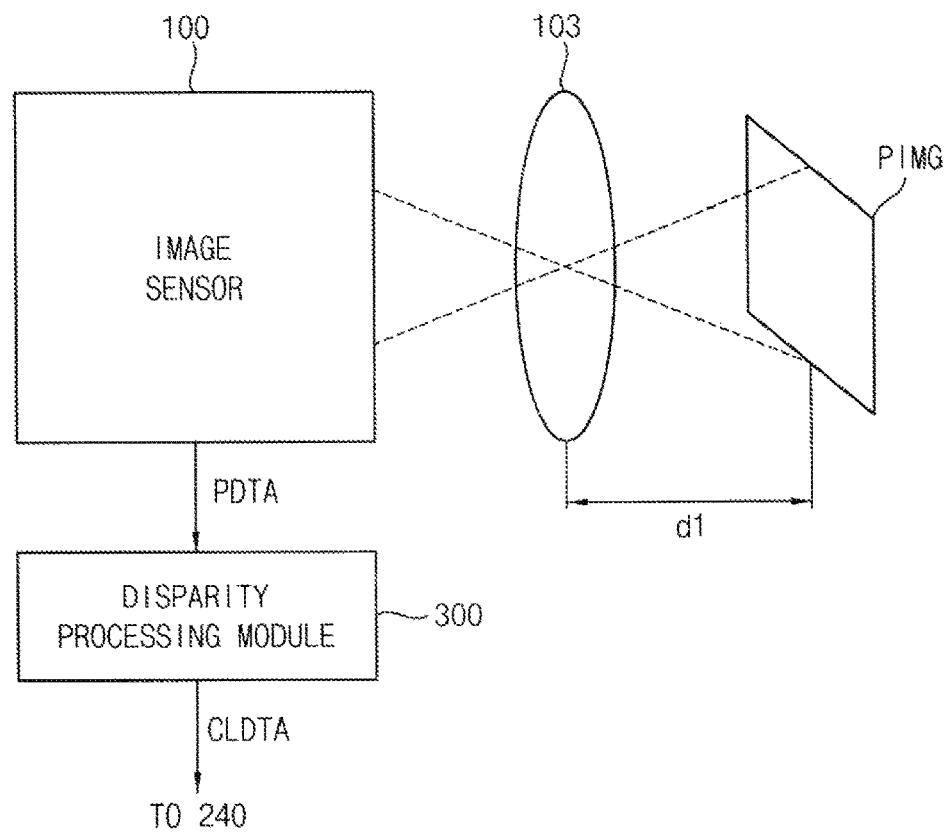
FIG. 6A illustrates an arrangement of the image sensor and a pattern image.

FIG. 6A illustrates an arrangement of the image sensor 100 and a pattern image PIMG, FIG. 6B illustrates the pattern image PIMG, and FIG. 6C illustrates a disparity of a pattern image data.

Referring to FIG. 6A, in some embodiments, the image sensor 100 may generate the pattern image data PDTA by capturing a pattern image PIMG located at a first distance d1 from the optical lens 103 (e.g., the image sensor 100 may generate the pattern image data PDTA in response to the pattern image PIMG), and may output the pattern image data PDTA to the disparity processing module 300. In some embodiments, the pattern image PIMG may correspond to the object 101.

The disparity processing module 300 may calculate the disparity data (or, the disparity correction data) CLDTA in the pattern image data PDTA and may store the disparity data CLDTA in the storage 240. The disparity data CLDTA may represent a difference of pixel values (or depth values) between a first pattern image data associated with the first photoelectric conversion element LP and a second pattern image data associated with the second photoelectric conversion element RP.

Referring to FIG. 6B, the pattern image PIMG is an image in which a diamond pattern is repeatedly disposed in a first direction D1 and a second direction D2.

Referring to FIG. 6C, it is noted that the disparity distortion is generated because a difference of pixel values between the first pattern image data the second pattern image data according to a position of each of the pixels in the pattern image data PDTA. Since the shapes of the exit pupil vary according to the positions of the pixels in the image sensor 100, the disparity distortion may be generated as in FIG. 6C. In an ideal situation, the pattern image data PDTA may be generated in response to the pattern image PIMG located at a constant position from the image sensor 100, the disparity of the pattern image data PDTA should be regular without regard to the positons of the pixels.

Figure 7:
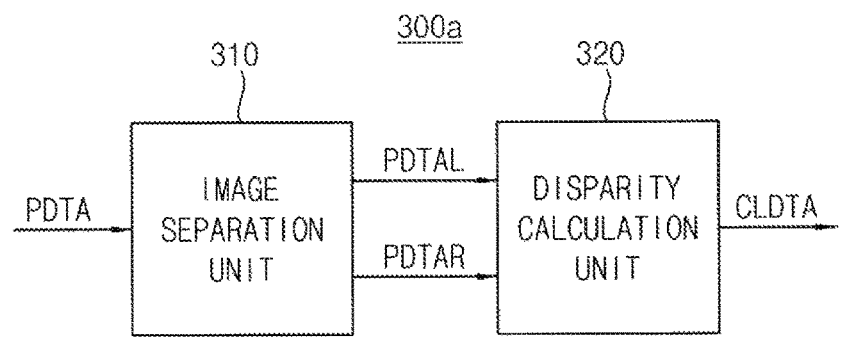
FIG. 7 is a block diagram illustrating an example of the disparity processing module in FIG. 1, according to exemplary embodiments.

FIG. 7 is a block diagram illustrating an example of the disparity processing module in FIG. 1, according to exemplary embodiments.

Referring to FIG. 7, a disparity processing module 300a may include an image separation unit 310 and a disparity calculation unit 320 The image separation unit 310 may receive the pattern image data PDTA and may generate a first pattern image data PDTAL and a second pattern image data PDTAR by separating the pattern image data PDTA with respect to a photoelectric conversion element. The first pattern image data PDTAL may be a set of data associated with the first photoelectric conversion element LP and the second pattern image data PDTAR may be a set of data associated with the second photoelectric conversion element RP.

The disparity calculation unit 320 may divide each of the first pattern image data PDTAL and the second pattern image data PDTAR into a plurality of blocks, may calculate a difference of pixel values of corresponding blocks of the blocks (e.g., corresponding blocks of the first pattern image data PDTAL and the second pattern image data PDTAR), and may generate the disparity data CLDTA which represents the difference of the pixel values. The disparity calculation unit 320 may generate the disparity data CLDTA by averaging pixel values of pixels in each of the blocks, or by calculating a difference of representative values of each block, which are obtained by selecting a mean value of the pixel values.

In an exemplary embodiment, for each block, the disparity calculation unit 320 may generate a first pixel (depth) value graph for the first pattern image data PDTAL, may generate a second pixel value graph for the second pattern image data PDTAR, may move the second pixel value graph with respect to the first pixel value graph that is fixed, and may generate a moving value of the second pixel value graph as a disparity of a corresponding block, which makes a difference between the first pixel graph and the second pixel graph a minimum.

Figure 8:
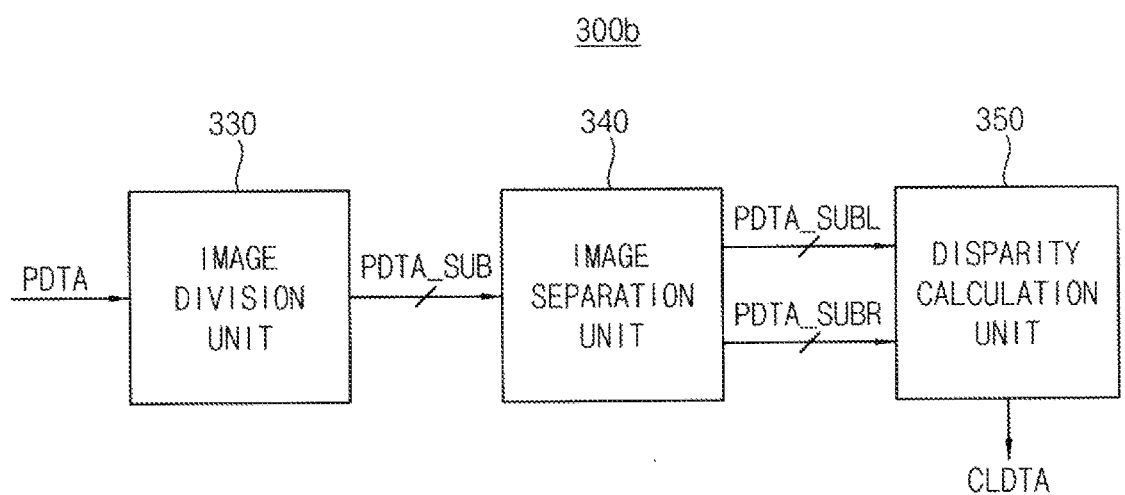
FIG. 8 is a block diagram illustrating another example of the disparity processing module in FIG. 1, according to exemplary embodiments.

FIG. 8 is a block diagram illustrating another example of the disparity processing module in FIG. 1, according to exemplary embodiments.

Referring to FIG. 8, a disparity processing module 300b may include an image division unit 330, an image separation unit 340, and a disparity calculation unit 350.

The image division unit 330 may receive the pattern image data PDTA, and may divide the pattern image data PDTA into a plurality of sub-pattern image data PDTA_SUB.

The image separation unit 340 may receive the plurality of sub-pattern image data PDTA_SUB, and may generate a plurality of first sub-pattern image data PDTA_SUBL and a plurality of second sub-pattern image data PDTA_SUBR by separating the plurality of sub-pattern image data PDTA_SUB with respect to a photoelectric conversion element. The plurality of first sub-pattern image data PDTA_SUBL may be a set of data associated with the first photoelectric conversion element LP in the pattern image data PDTA and the plurality of second sub-pattern image data PDTA_SUBR may be a set of data associated with the second photoelectric conversion element RP in the pattern image data PDTA.

The disparity calculation unit 350 may calculate a difference of pixel values of corresponding pairs of the plurality of first sub-pattern image data PDTA_SUBL and the plurality of second sub-pattern image data PDTA_SUBR, and may generate the disparity data CLDTA which represents the difference of the pixel values.

In an exemplary embodiment, the disparity calculation unit 350 may generate a first pixel (depth) value graph for the first sub-pattern image data PDTA_SUBL, may generate a second pixel value graph for second sub-pattern image data PDTA_SUBR, may move the second pixel value graph with respect to the first pixel value graph that is fixed, and may generate a moving value of the second pixel value graph as a disparity of a corresponding sub-pattern image data, which makes a difference between the first pixel graph and the second pixel graph a minimum.

FIG. 9A illustrates that the pattern image data is divided into a plurality of blocks in the disparity processing module in FIG. 1.

Referring to FIG. 9A, when the pattern image data PDTA includes s*t pixels and one block BLK is set to include M*M pixels, a number of blocks BLK corresponds to p*q for covering the s*t pixels. Here, p is an integer equal to or greater than s/M and q is an integer equal to or greater than t/M.

FIG. 9B illustrates a disparity data output from the disparity processing module in FIG. 1.

Referring to FIG. 9B, a disparity of the first pattern image data PDTAL and the second pattern image data PDTAR for each block is represent by a height in a third direction D3. In FIG. 9B, a coordinate in the first direction D1 and the second direction D2 may represent a location of each of the blocks constituting the pattern image data PDTA. In the example of FIG. 9B, the axis in the first direction D1 includes the labels 1, 2, 3, 4, 5, 6, . . . 16 corresponding to the locations of the blocks BLKs in the first direction.

Figure 10:
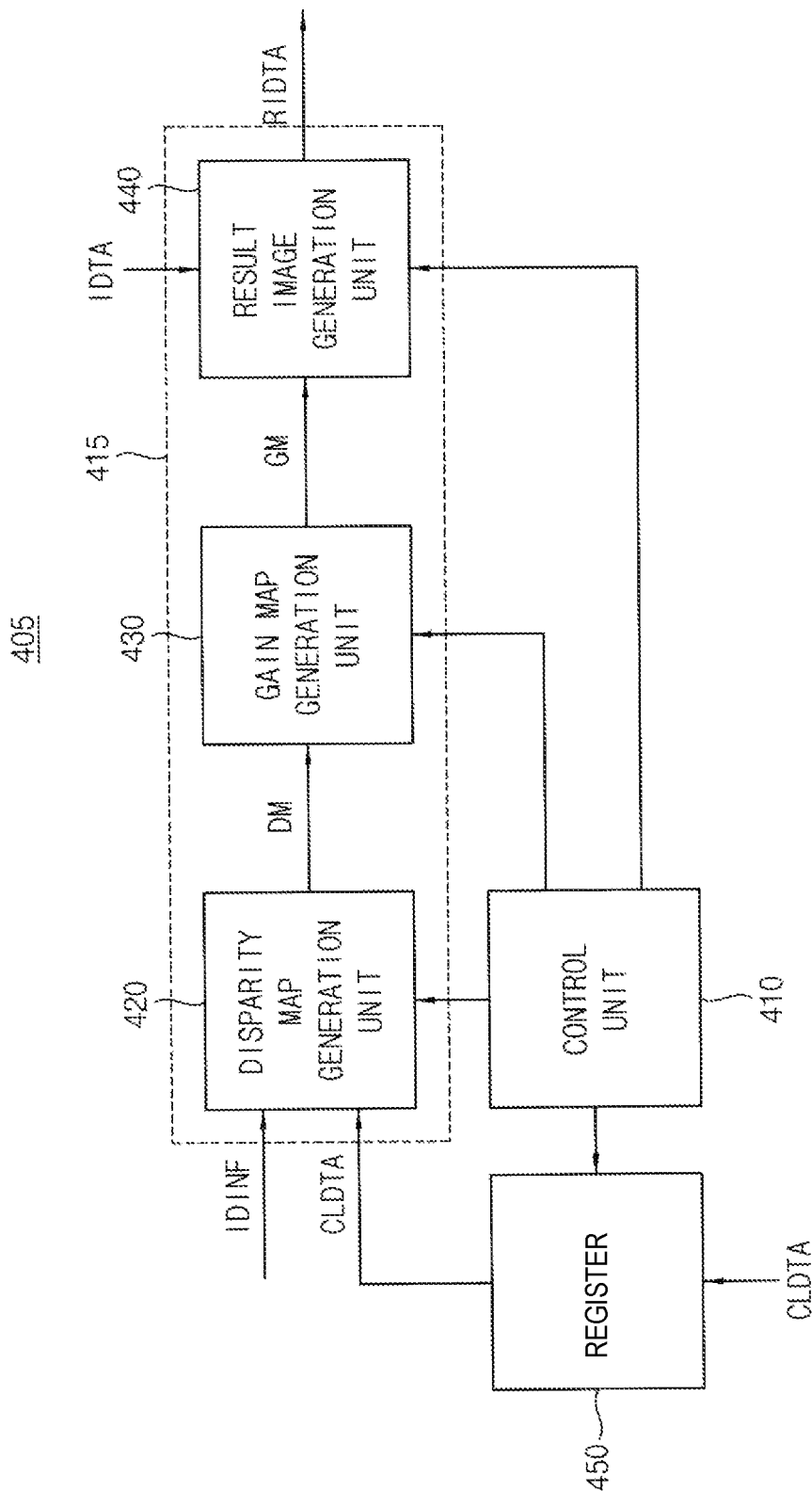
FIG. 10 is a block diagram illustrating an example of a disparity correction unit included in the image signal processor in FIG. 1, according to exemplary embodiments.

FIG. 10 is a block diagram illustrating an example of a disparity correction unit 405, which may be included in the image signal processor in FIG. 1, according to exemplary embodiments. In some embodiments, the disparity correction unit 405 may correspond to ISP 400 of FIG. 1, and may include hardware configured to perform various processing functions. Referring to FIG. 10, a disparity correction unit 405 may include a control unit 410, a disparity correction unit 415, and a register 450. The disparity correction unit 415 may include a disparity map generation unit 420, a gain map generation unit 430, and a result image generation unit 440.

The disparity map generation unit 420 may receive input information IDINF of the image data IDTA and the disparity data CLDTA, and may generate a disparity map DM corresponding to a size of the image data IDTA by performing interpolation on the disparity data CLDTA. The input information IDINF of the image data IDTA may be associated with a size of the image data IDTA and position information of each pixel in the image data IDTA.

The disparity map generation unit 420 generates the disparity map DM by performing bilinear interpolations on the disparity data CLDTA based on the position information of each pixel in the image data IDTA.

The gain map generation unit 430 may receive the disparity map DM, and may generate a gain map GM to be applied to the image data IDTA based on the disparity map DM. The gain map generation unit 430 may generate a difference between the maximum of disparities in the disparity map DM and disparity of a corresponding pixel as a gain of the corresponding pixel.

The result image generation unit 440 may receive the image data IDTA and the gain map GM, may compensate for each pixel value of the image data IDTA by referring to a gain of each pixel in the gain map GM, and may generate the result image data RIDTA. For example, the result image generation unit 440 may generate the result image data RIDTA by applying the gain map GM to the image data IDTA.

Therefore, disparity distortion in the result image data RIDTA may be corrected mainly in a portion of the image data IDTA (i.e., a peripheral region (or, edge portion of the image data IDTA)) in which the disparity distortion occurs with greater amounts of distortion.

Compensating for each pixel value in the image data IDTA may refer to compensating for the moving value such that the first image data associated with the first photoelectric conversion element matches the second image data associated with the second photoelectric conversion element in each pixel in the image data IDTA.

The control unit 410 may control the disparity map generation unit 420, the gain map generation unit 430, the result image generation unit 440, and the register 450. For example, the control unit 410 may monitor and direct the processing performed by each of the disparity map generation unit 420, the gain map generation unit 430, the result image generation unit 440, and the register 450.

Figure 11A:
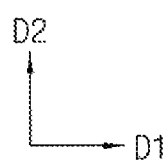
FIG. 11A illustrates the disparity data.
Figure 11B:
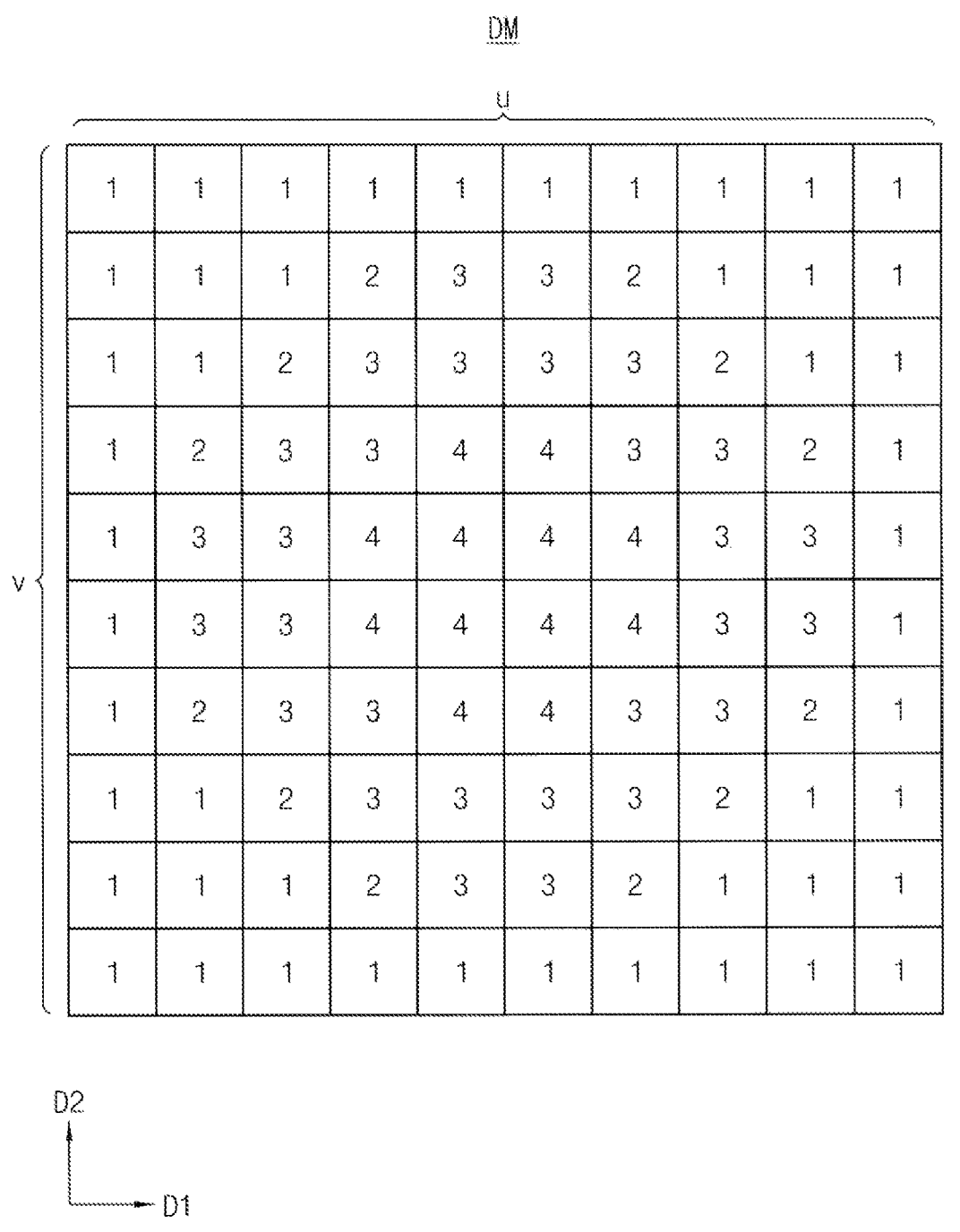
Figure 11C:
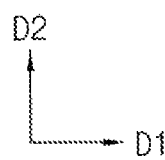
FIG. 11C illustrates the gain map of FIG. 10.

FIG. 11A illustrates the disparity data, FIG. 11B illustrates the disparity map, and FIG. 11C illustrates the gain map, in FIG. 10.

Referring to FIG. 11A, the disparity data CLDTA may include p blocks BLK in the first direction D1 and may include q blocks BLK in the second direction D2. Each of the p*q blocks BLK may have a corresponding disparity value. The disparity value may represent a difference between representative values of pixel values of each of the first pattern image data and the second pattern image data in the corresponding block.

Referring to FIGS. 10 and 11B, the disparity map generation unit 420 may generate the disparity map DM by performing interpolation on the disparity data CLDTA such that the disparity map DM has a size corresponding to the size of the image data IDTA. For example, the number of disparity values in the first direction D1 of the disparity map DM may be equal to the number of pixels in the first direction D1 of the image data IDTA, and the number of disparity values in the second direction D2 of the disparity map DM may be equal to the number of pixels in the second direction D2 of the image data IDTA. The disparity map DM may have u disparity values in the first direction D1 and may have v disparity values in the second direction D2. Here, u is a natural number greater than p and v is a natural number greater than q.

Referring to FIGS. 10 and 11C, the gain map generation unit 430 may generate the gain map GM which has a gain based on a difference between the maximum of disparity values in the disparity map DM and disparity value of each pixel. In this example, the maximum of the disparity values in the disparity map DM of FIG. 11B is 4, and each location of the gain map GM reflects the difference between 4 and the disparity value at that pixel location (e.g., 1-4=−3, 2-4=−2, 3-4=−1, and 4-4=0). The gain map GM may have u gain values in the first direction D1 and may have v gain values in the second direction D2 such that the gain map GM may correspond to pixels in the image data IDTA.

The result image generation unit 440 in FIG. 10 may compensate for each pixel value of the pixels in the image data IDTA by referring to a gain of each pixel in the gain map GM to generate the result image data RIDTA. Therefore, the result image data RIDTA may have a reduced disparity distortion.

Figure 12:
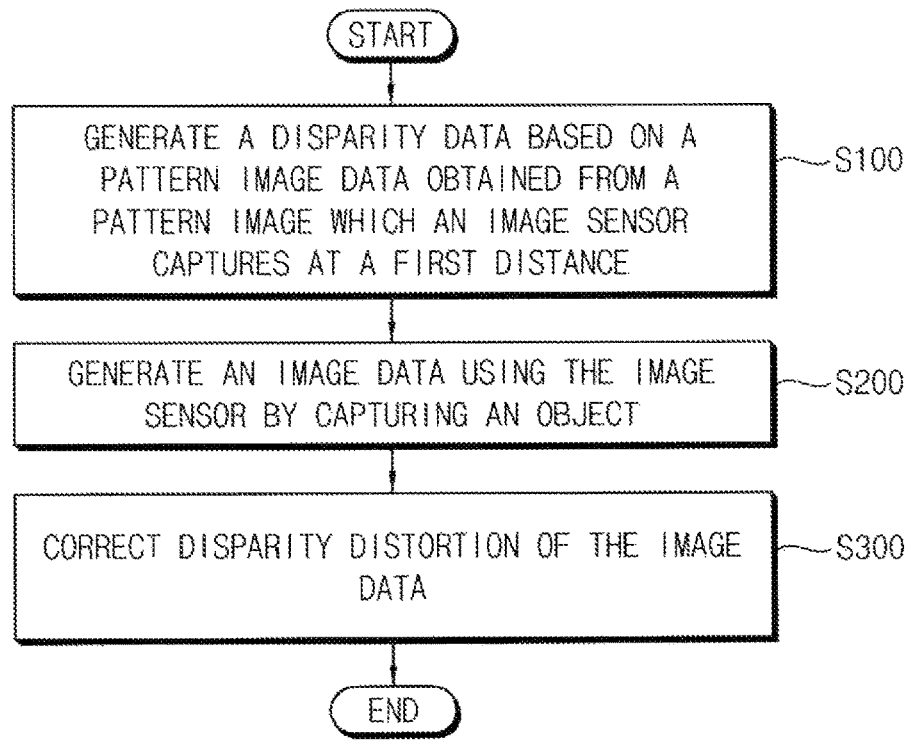
FIG. 12 is a flow chart illustrating a method of operating an image processing system, according to exemplary embodiments.

FIG. 12 is a flow chart illustrating a method of operating an image processing system, according to exemplary embodiments.

Referring to FIGS. 1 through 12, in a method of operating an image processing system 10 including an image sensor 100 which includes a pixel array having a plurality of pixels, each pixel including at least a first photoelectric conversion element and a second photoelectric conversion element, a disparity processing module 300 generates disparity data CLDTA based on a pattern image data PDTA which is generated by the image sensor 100 by capturing a pattern image PIMG located at a first distance d1 from the image sensor 100 (S100). In some embodiments, the image sensor 100 captures a pattern image PIMG located at a first distance d1 from the optical lens 103. The disparity processing module 300 may generate the disparity data CLDTA and store the disparity data CLDTA in a storage 240. The disparity data CLDTA may represent a difference of pixel values (or depth values) between a first pattern image data associated with the first photoelectric conversion element LP and a second pattern image data associated with the second photoelectric conversion element RP.

The image sensor 100 captures object 101 to generate an image data IDTA and provides the image data IDTA to the ISP 400 (S200).

The ISP 400 corrects disparity distortion of the image data IDTA based on the disparity data CLDTA to generate a result image data RIDTA (S300), and provides the result image data RIDTA to the display 250 through an interface 230.

Figure 13:
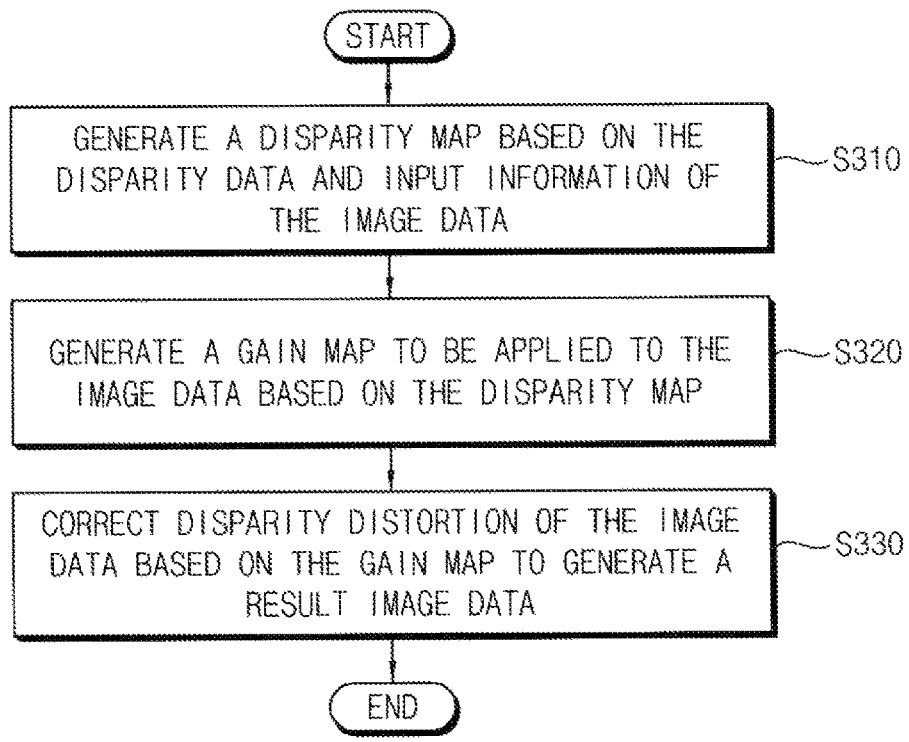
FIG. 13 is a flow chart illustrating an operation of correcting disparity distortion of the image data in FIG. 12, according to exemplary embodiments.

FIG. 13 is a flow chart illustrating an operation of correcting disparity distortion of the image data in step S300 of FIG. 12, according to exemplary embodiments.

Referring to FIGS. 1 through 13, for correcting disparity distortion of the image data IDTA, a disparity map generation unit 420 may receive an input information IDINF of the image data IDTA and the disparity data CLDTA and may generate a disparity map DM corresponding to a size of the image data IDTA by performing interpolation on the disparity data CLDTA (S310). The input information IDINF of the image data IDTA may be associated with a size of the image data IDTA and position information of each pixel in the image data IDTA.

A gain map generation unit 430 may receive the disparity map DM, and may generate a gain map GM to be applied to the image data IDTA based on the disparity map DM (S320).

A result image generation unit 440 may correct the disparity distortion of the image data IDTA based on the gain map GM to generate the result image data RIDTA (S330). For example, the result image generation unit 440 may receive the image data IDTA and the gain map GM, may compensate for each pixel value of the image data IDTA by referring to a gain of each pixel in the gain map GM, and may generate the result image data RIDTA. As illustrated in FIG. 10, the result image data RIDTA may be output by the result image generation unit 440 of the disparity correction unit 415.

Figure 14:
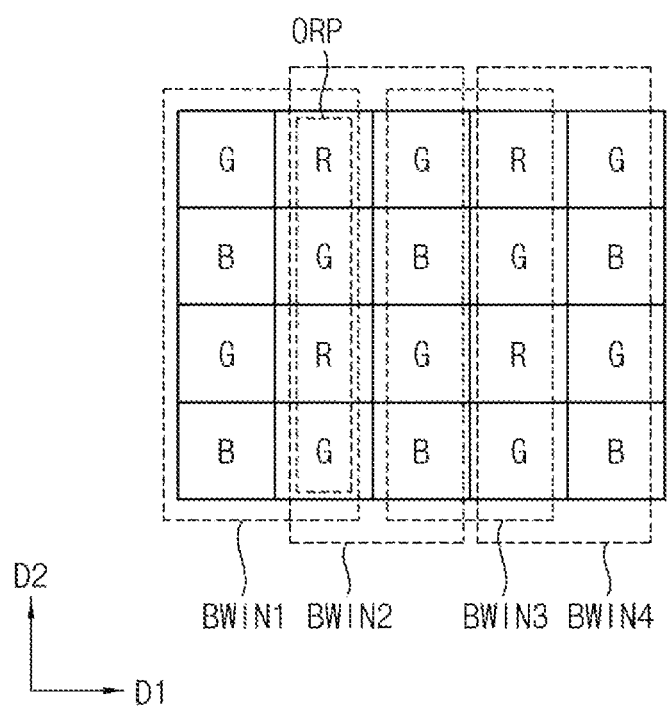
FIG. 14 illustrates a binning operation performed by a binning block in the image sensor in FIG. 1, according to exemplary embodiments.

FIG. 14 illustrates a binning operation performed by a binning block in the image sensor in FIG. 1 according to exemplary embodiments.

Referring to FIGS. 1 and 14, in a binning mode (a second operation mode), the binning block 130 may sequentially select a plurality of binning windows BWIN1~BWIN4 in the pixel array 110, each of the binning windows BWIN1~BWIN4 including (2n)*(2m) pixels (2n represents a number of pixels in a first direction D1 and 2m represents a number of pixels in a second direction D2) such that m pixels in the second direction D2 are repeatedly selected. Then the binning block 130 may generate a binning analog signal BAS (refer to FIG. 15) based on analog signals AS (refer to FIG. 15) generated from at least a portion of the pixels in each of the binning windows BWIN1~BWIN4. In some embodiments, the binning analog signal BAS may be generated based on analog signals AS generated from all of the pixels in each of the binning windows BWIN1~BWIN4. The binning block 130 may generate the binning analog signal BAS sequentially from each of the binning windows BWIN1~BWIN. In FIG. 14, it is assumed that n is 1 and m is 2. In other exemplary embodiments, m may be 3 or 4, or another number.

When a first binning window BWIN1 is selected in FIG. 14, the binning block 130 selects pixels corresponding to a green color filter of the pixels in the first binning window BWIN1, and calculates a green color value of the first binning window BWIN1 by binning (or, averaging) analog signals from the selected pixels. In addition, when the first binning window BWIN1 is selected in FIG. 14, the binning block 130 may generate a luminance value of the first binning window BWIN1 by averaging luminance values of all pixels in the first binning window BWIN1.

When a second binning window BWIN2 is selected in FIG. 14, the binning block 130 selects the second binning window BWIN2 by including overlapping pixels ORO, which overlap with the first binning window BWIN1. Therefore, the binning block 130 maintains a spatial resolution in the first direction D1, a depth resolution of the image data IDTA may be enhanced after the binning operation on the image data IDTA is completed. Description with respect to the second binning window BWIN2 may be similarly applied to a third binning window BWIN3 and a fourth binning window BWIN4. For example, BWIN3 may include pixels that are shared or overlap with BWIN2, and BWIN4 may include pixels that are shared or overlap with BWIN3.

The binning block 130, in a non-binning mode (a first operation mode), may provide the ADC block 125 with an analog signal AS output from each of the pixels in the pixel array 110 in response to an incident light.

Figure 15:
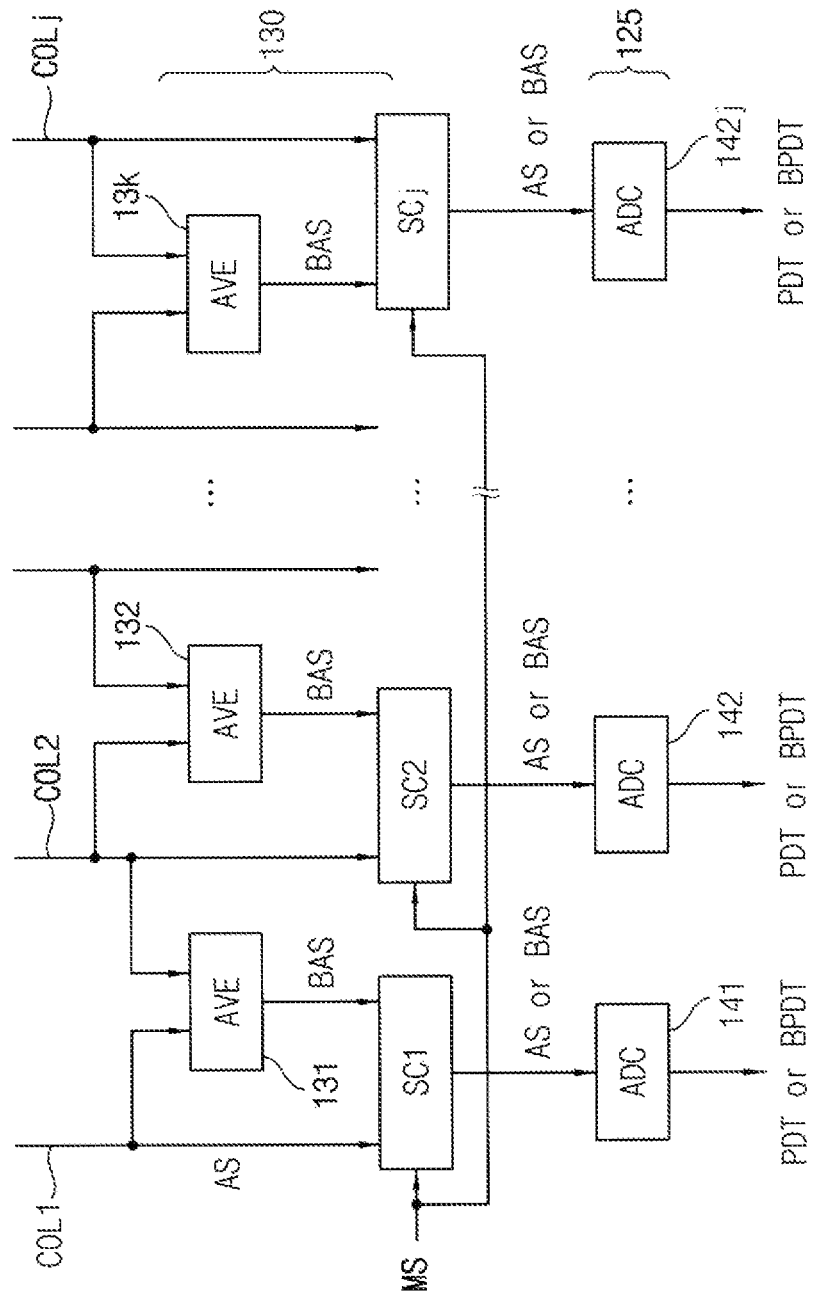
FIG. 15 is a circuit diagram illustrating the binning block and the analog-to-digital converter (ADC) block in the image sensor in FIG. 1, according to exemplary embodiments.

FIG. 15 is a circuit diagram illustrating the binning block and the ADC block in the image sensor in FIG. 1 according to exemplary embodiments.

The binning block 130 and the ADC block 125 may be collectively referred to as an analog to digital conversion circuit.

Referring to FIG. 15, the binning block 130 may include a plurality of averaging circuits 131~13k (k is an integer greater than one) and a plurality of selection circuits SC1~SCj (j is an integer greater than one), and the ADC block 125 may include a plurality of ADCs 141~14j.

Each of the averaging circuits 131~13k may be connected between two adjacent column lines of column lines COL1~COLj. Each of the averaging circuits 131~13k may output the binning analog signal BAS by averaging analog signals AS output from at least some of the pixels in each of the binning windows. In some embodiments, the binning analog signal BAS may be generated by averaging analog signals AS output from all of the pixels in each of the binning windows BWIN1~BWIN4. The averaging circuits 131~13k may output the binning analog signal BAS to a corresponding one of the selection circuits SC1~SCj. Each of the selection circuits SC1~SCj may provide to a corresponding one of the ADCs 141~14j the analog signal AS output from each of the column lines COL1~COLj in a first operation mode and may provide to a corresponding one of the ADCs 141~14j the binning analog signal BAS in a second operation mode, in response to a mode signal MS.

Each of the ADCs 141~14j may output a pixel data PDT by performing an analog-to-digital conversion on the analog signal AS in the first operation mode, and may output a binning pixel data BPDT by performing an analog-to-digital conversion on the binning analog signal BAS.

FIGS. 16 and 17 respectively illustrate examples of the pixel array in the image sensor in FIG. 1.

FIG. 16 illustrates a portion of the pixel array 110 when the pixel array 110 includes RWB Bayer color filter array pattern. When the pixel array 110 includes RWB Bayer color filter array pattern, a depth resolution of the image data IDTA may be enhanced by employing binning windows to which a moving average described with reference to FIG. 14 is applied.

FIG. 17 illustrates a portion of the pixel array 110 when the pixel array 110 includes RWBW color filter array pattern. When the pixel array 110 includes RWBW color filter array pattern, a depth resolution of the image data IDTA may be enhanced by employing binning windows to which a moving average described with reference to FIG. 14 is applied.

Figure 18:
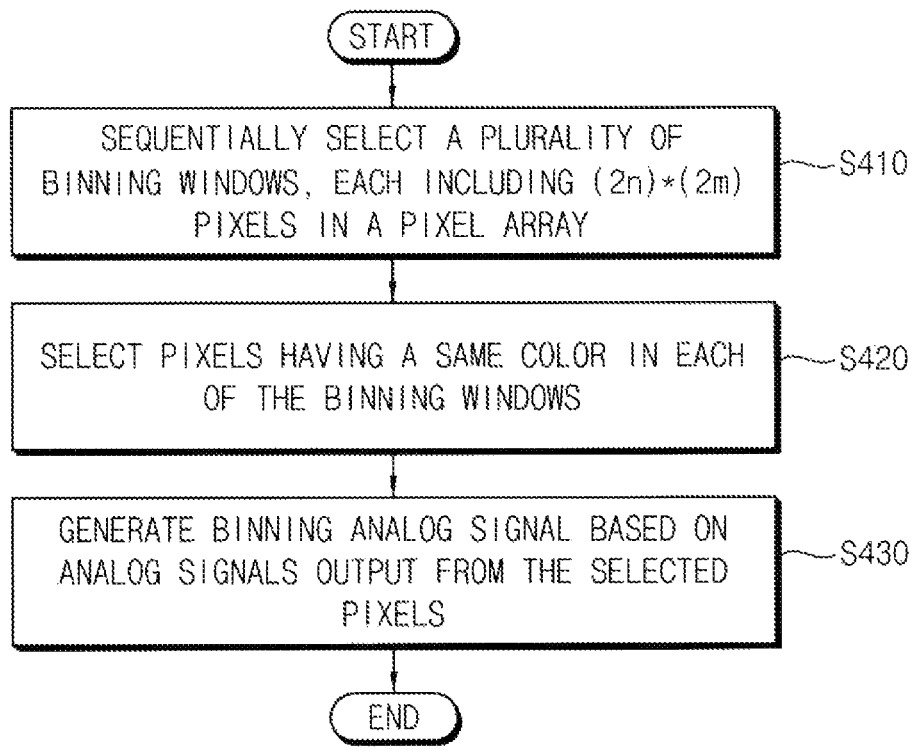
FIG. 18 is a flow chart illustrating a method of binning pixels of an image sensor, according to exemplary embodiments.

FIG. 18 is a flow chart illustrating a method of binning pixels of an image sensor according to exemplary embodiments.

Referring to FIGS. 1 through 5D and 14 through 18, in a method of binning pixels in an image senor 100 including a pixel array 110 having a plurality of pixels arranged in a regular pattern, each of the pixels including at least first photoelectric conversion element LP and a second photoelectric conversion element RP, the binning block 130 may sequentially select a plurality of binning windows BWIN1~BWIN4 in the pixel array 110, each of the binning windows BWIN1~BWIN4 including (2n)*(2m) pixels (2n represents a number of pixels in a first direction D1 and 2m represents a number of pixels in a second direction D2) such that m pixels in the second direction D2 are repeatedly selected (S410). In exemplary embodiments, for each binning window BWIN, a first half of the pixels may be shared with a previously-selected binning window, and a second half of the pixels may be shared with a subsequently-selected binning window. For example, with reference to FIG. 14, binning window BWIN2, which is exemplarily illustrated as having two columns of pixels, may share the first column of pixels with binning window BWIN1 and the second column of pixels with binning window BWIN3.

The binning block 130 selects pixels having a same color from each of the binning windows BWIN1~BWIN4 (S420). The binning block 130 generates the binning analog signal BAS by averaging analog signals corresponding to the selected pixels (S430).

Figure 19:
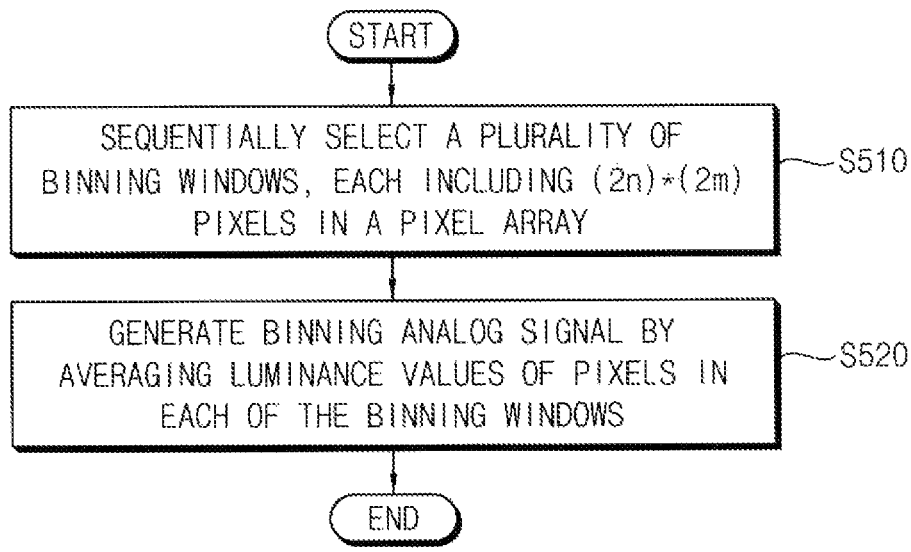
FIG. 19 is a flow chart illustrating a method of binning pixels of an image sensor, according to exemplary embodiments.

FIG. 19 is a flow chart illustrating a method of binning pixels of an image sensor according to exemplary embodiments.

Referring to FIGS. 1 through 5D, 14 through 17, and 19, in a method of binning pixels in an image senor 100 including a pixel array 110 having a plurality of pixels arranged in a regular pattern, each of the pixels including at least a first photoelectric conversion element LP and a second photoelectric conversion element RP, the binning block 130 may sequentially select a plurality of binning windows BWIN1~BWIN4 in the pixel array 110, each of the binning windows BWIN1~BWIN4 including (2n)*(2m) pixels (2n represents a number of pixels in a first direction D1 and 2m represents a number of pixels in a second direction D2) such that m pixels in the second direction D2 are repeatedly selected (S510). For example, for each binning window BWIN, a first half of the pixels may be shared with a previously-selected binning window, and a second half of the pixels may be shared with a subsequently-selected binning window.

The binning block 130 generates the binning analog signal BAS by averaging luminance values of pixels in each of binning windows BWIN1~BWIN4 (S520). The binning analog signal BAS may be a luminance value of each of the binning windows BWIN1~BWIN4.

Figure 20A:
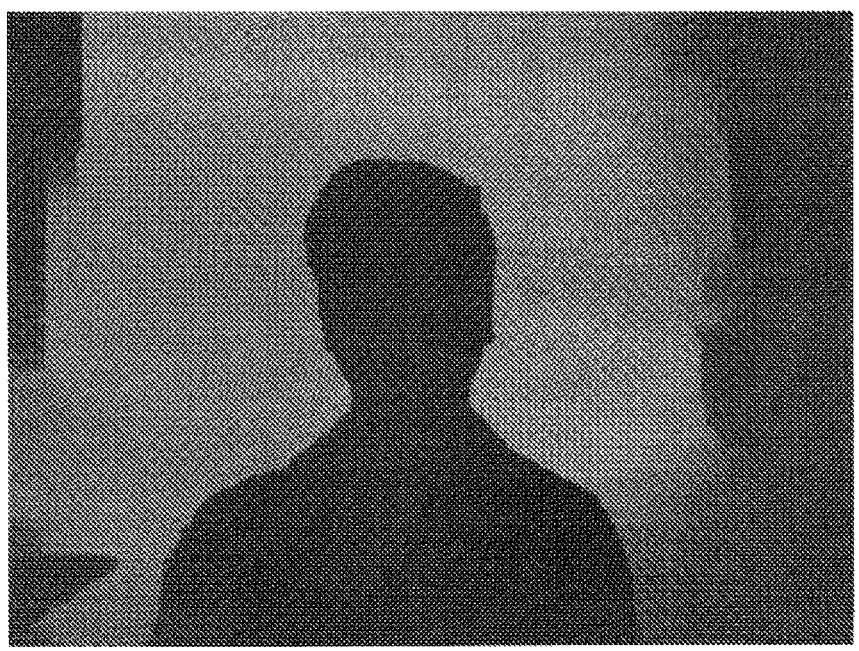
FIGS. 20A and 20B are image data for explaining effects of exemplary embodiments.
Figure 20B:
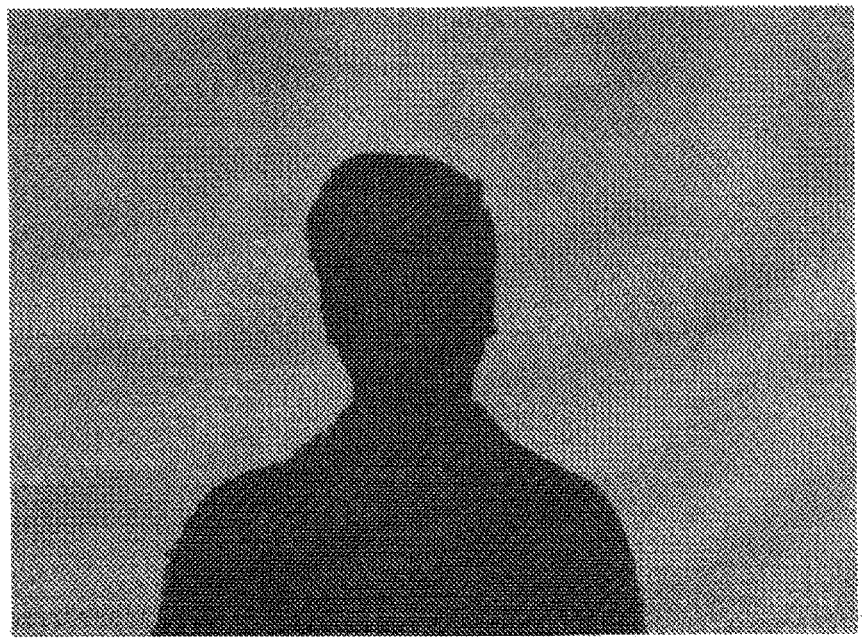

FIGS. 20A and 20B are image data for explaining effect of exemplary embodiments.

FIG. 20A is an image data reflecting an example of when the ISP 400 does not correct the disparity distortion, and FIG. 20B is an image data reflecting an example of when the ISP 400 corrects the disparity distortion according to exemplary embodiments.

Referring to FIGS. 20A and 20B, it is noted that when the ISP 400 corrects the disparity distortion, a disparity distortion in a peripheral region of the image data is reduced. For example, in FIG. 20A, the left and right peripheral regions show uncorrected disparity distortion as dark regions that do not correspond to features of the captured image.

Figure 21A:
FIGS. 21A and 21B are image data for explaining effects of exemplary embodiments.
Figure 21B:

FIGS. 21A and 21B are image data for explaining effect of exemplary embodiments.

FIG. 21A is a depth map of an image data reflecting an example of when the image sensor 100 performs a general binning, and FIG. 21B is a depth map of an image data reflecting an example of when image sensor 100 performs a binning which uses a moving average according to exemplary embodiments.

Referring to FIGS. 21A and 21B, it is noted that a resolution of the depth map of the image data is enhanced when image sensor 100 performs a binning which uses a moving average. For example, the depth map of FIG. 21B illustrates a greater range of depth values.

Figure 22:
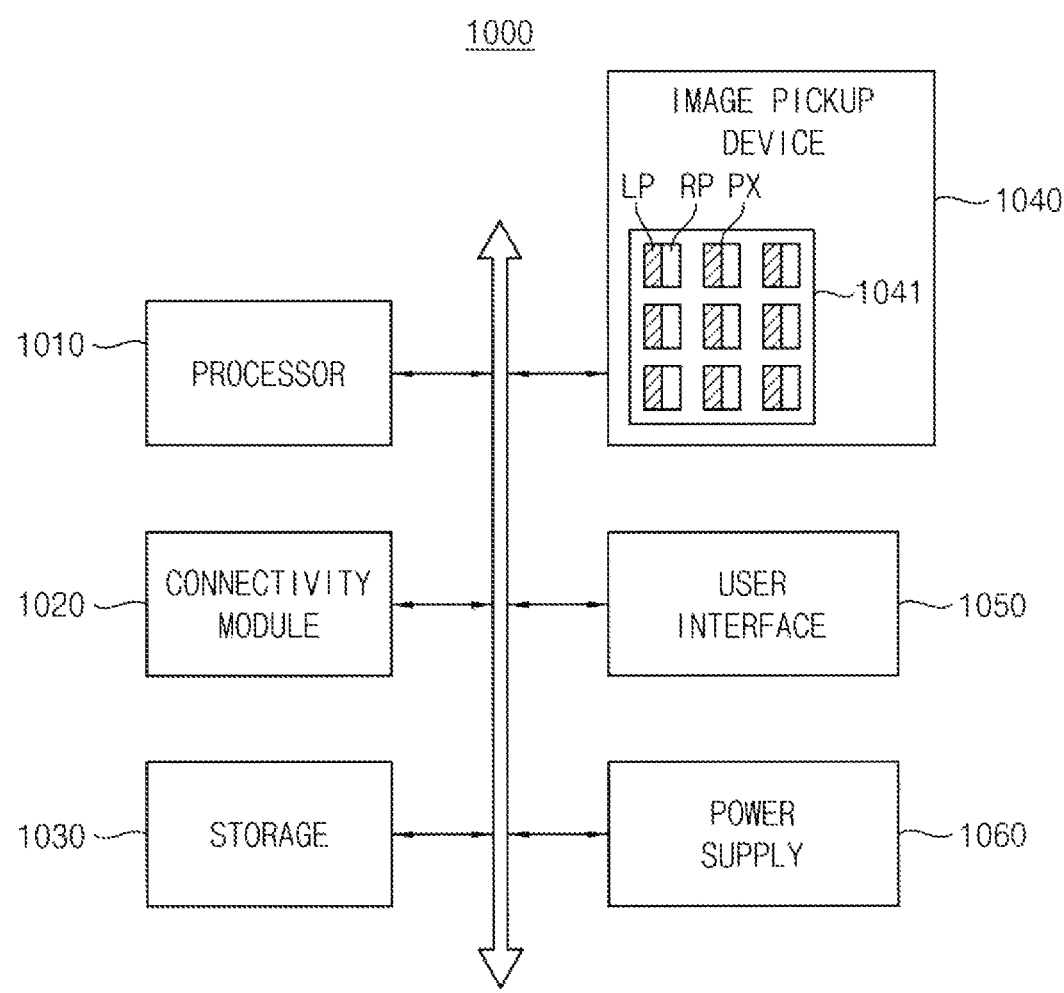
FIG. 22 is a block diagram illustrating an electronic system, according to exemplary embodiments.

FIG. 22 is a block diagram illustrating an electronic system according to exemplary embodiments.

Referring to FIG. 22, an electronic system 1000 includes a processor 1010 and an image pickup device 1040. The electronic system 1000 may further include a connectivity module 1020, a storage device 1030, a user interface 1050, and a power supply 1060.

The processor 1010 controls overall operations of the electronic system 1000.

The image pickup device 1040 is controlled by the processor 1010. The image pickup device 1040 may be the image processing system 10 according to exemplary embodiments. The image pickup device 1040 may include a pixel array 1041 including a plurality of pixels PX and each of the pixels PX includes a first photoelectric conversion element LP and a second photoelectric conversion element RP. Therefore, the image pickup device 1040 may correct disparity distortion of an image data based on a disparity data. In addition, the image pickup device 1040 may perform a binning on analog signals from the pixels PX, which uses a moving average, and thus may enhance a resolution of a depth map of the image data in a first direction (a row direction).

The connectivity module 1020 may communicate with an external device (not shown). The storage device 1030 may operate as a data storage for data processed by the processor 1010 or a working memory in the electronic system 1000. The user interface 1050 may include at least one input device such as, for example, a keypad, a button, a touch screen, etc., and/or at least one output device such as, for example, a display device, etc. The power supply 1060 may provide power to the electronic system 1000.

The present disclosure may be applied to various image pickup device and various imaging systems. For instance, the present disclosure may be applied to a mobile phone, a smart phone, a personal digital assistant (PDA), a portable multimedia player (PMP), a portable game console, a wearable system, an internet of things (IoT) system, 3D geometry reconstruction system, an array camera system, a virtual reality (VR) system, an augmented reality (AR) system, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image sensor comprising:
    a pixel array including a plurality of pixels, each of the pixels including at least a first photoelectric conversion element and a second photoelectric conversion element, a microlens on the first and second photoelectric conversion elements;
    an analog-to-digital conversion circuit configured to generate a first image data by performing an analog-to-digital conversion on a first analog signal output from each of the pixels in response to an image located at a first distance from the image sensor and configured to generate a second image data by performing an analog-to-digital conversion on a second analog signal output from each of the pixels in response to an object; and
    a disparity calculation unit configured to calculate a disparity of the first image data,
    wherein the disparity represents a difference between first pixel values of a first sub image data and second pixel values of a second sub image data, the first sub image data being associated with the first photoelectric conversion element of the first image data and the second sub image data being associated with the second photoelectric conversion element of the first image data.

2. The image sensor of claim 1, wherein the first pixel values and the second pixel values are depth values of corresponding pixels.

3. The image sensor of claim 1, wherein the disparity calculation unit comprises:
    a disparity map generation unit configured to generate a disparity map associated with the second image data, based on the disparity and input information of the second image data;
    a gain map generation unit configured to generate a gain map to be applied to the second image data, based on the disparity map; and
    a result image generation unit configured to generate a result image data by applying the gain map to the second image data.

4. The image sensor of claim 3, wherein the disparity map generation unit is further configured to generate the disparity map by interpolating disparity values associated with each of a plurality of blocks, wherein the plurality of blocks constitute the first image data and the disparity includes the disparity values.

5. The image sensor of claim 3, wherein the gain map generation unit is further configured to generate the gain map based on a maximum value of disparity values from each of a plurality of binning windows such that differences between the maximum value and each of the disparity values are offset.

6. The image sensor of claim 3, wherein the result image generation unit is further configured to generate the result image data by compensating for a pixel value of each pixel in the second image data based on a gain for each pixel in the gain map.

7. The image sensor of claim 1, further comprising a disparity processing module, wherein the disparity processing module is configured to receive the first image data and calculate the disparity.

8. The image sensor of claim 7, wherein the disparity processing module comprises:
  an image separation unit configured to separate the first image data into the first sub image data associated with the first photoelectric conversion element and the second sub image data associated with the second photoelectric conversion element; and
  a disparity calculator configured to divide the first sub image data into a plurality of first blocks, divide the second sub image data into a plurality of second blocks, calculate a difference between pixel values of corresponding pixels of the first blocks and the second blocks, and generate the disparity.

9. The image sensor of claim 8, wherein the disparity calculator is further configured to calculate a difference between representative values of the pixel values of the corresponding pixels as the difference between the pixel values.

10. The image sensor of claim 7, wherein the disparity processing module comprises:
  an image division unit configured to separate the first image data into a plurality of blocks to generate a plurality of sub-pattern image data;
  an image separation unit configured to separate each of the plurality of sub-pattern image data into a first sub-pattern image data associated with the first photoelectric conversion element and second sub-pattern image data associated with the second photoelectric conversion element; and
  a disparity calculator configured to calculate a difference between pixel values of a corresponding pixel pair of the first sub-pattern image data and the second sub-pattern image data and generate the disparity.

11. The image sensor of claim 1, wherein each of the pixels includes a second microlens on the microlens.

12. The image sensor of claim 1, wherein each of the first and second photoelectric conversion elements is one of a photodiode, a phototransistor, a photogate, or a pinned-photodiode.

13. An image processing system comprising:
  an image sensor including a plurality of pixels, each of the pixels including at least a first photoelectric conversion element and a second photoelectric conversion element, a microlens on the first and second photoelectric conversion elements, wherein the image sensor is configured to generate a first image data in response to an image located at a first distance from the image sensor, configured to generate a second image data and configured to calculate a disparity of the first image data; and
  an image signal processor configured to correct a disparity distortion of the image data output by applying the disparity to the second image data to generate a result image data,
  wherein the disparity represents differences between first pixel values of first sub image data and second pixel values of second sub image data, the first sub image data being associated with the first photoelectric conversion element of the first image data and the second sub image data being associated with the second photoelectric conversion element of the first image data.

14. The image processing system of claim 13, wherein the image sensor includes:
  a pixel array including the plurality of pixels;
  an analog-to-digital conversion circuit configured to generate the first image data by performing an analog-to-digital conversion on a first analog signal output from each of the pixels in response to the image and configured to generate the second image data by performing an analog-to-digital conversion on a second analog signal output from each of the pixels in response to an object; and
  a disparity calculation unit configured to calculate the disparity of the first image data.

15. The image processing system of claim 13, wherein the image sensor comprises:
  an analog-to-digital conversion circuit configured to operate in a first operation mode and a second operation mode,
  wherein, in the first operation mode, the analog-to-digital conversion circuit is configured to generate pixel data by performing an analog-to-digital conversion on an analog signal output from each of the pixels in a pixel array in response to an incident light, divide the pixels into a plurality of binning windows, each of the binning windows including (2n)*(2m) pixels, where 2n represents a number of pixels in a first direction and 2m represents a number of pixels in a second direction, and sequentially select the binning windows such that m pixels in the second direction are repeatedly selected, and
  wherein, in the second operation mode, the analog-to-digital conversion circuit is configured to generate a binning pixel data by performing a binning operation and an analog to digital conversion on analog signals generated from at least a portion of the pixels in each of the binning windows; and
  a timing generator configured to control operations of the pixel array and the analog-to-digital conversion circuit.

16. The image processing system of claim 15, wherein the analog-to-digital conversion circuit is further configured to select pixels having a same color from each of the binning windows and generate the binning pixel data based on analog signals generated from the selected pixels.

17. The image processing system of claim 15, wherein the analog-to-digital conversion circuit is further configured to generate the binning pixel data for each binning window based on an analog signal generated from all pixels in the binning window, and wherein the binning pixel data corresponds to a luminance value of the pixels in the binning window.

18. The image processing system of claim 13, wherein each of the pixels includes a second microlens on the microlens.

19. The image processing system of claim 13,
  wherein the image signal processor includes a display processing module, and
  wherein the display processing module comprises:
    a disparity map generation unit configured to generate a disparity map associated with the second image data, based on the disparity and input information of the second image data;
    a gain map generation unit configured to generate a gain map to be applied to the second image data, based on the disparity map; and
    a result image generation unit configured to generate the result image data by applying the gain map to the second image data.

20. The image processing system of claim 13, wherein each of the first and second photoelectric conversion elements is one of a photodiode, a phototransistor, a photogate, or a pinned-photodiode.

* * * * *